(12) United States Patent
Chen et al.

(10) Patent No.: US 12,245,151 B2
(45) Date of Patent: Mar. 4, 2025

(54) SIGNALING METHODS FOR REDUCING POWER CONSUMPTION OF WIRELESS DEVICES IN POWER-SAVING MODES

(71) Applicant: ZTE Corporation, Guangdong (CN)

(72) Inventors: Mengzhu Chen, Guangdong (CN); Qiujin Guo, Guangdong (CN); Jun Xu, Guangdong (CN); Hao Wu, Guangdong (CN); Xiaoying Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 344 days.

(21) Appl. No.: 17/673,707

(22) Filed: Feb. 16, 2022

(65) Prior Publication Data

US 2022/0264461 A1  Aug. 18, 2022

Related U.S. Application Data

(63) Continuation of application No. PCT/CN2019/101227, filed on Aug. 17, 2019.

(51) Int. Cl.
*H04B 7/185* (2006.01)
*H04W 52/02* (2009.01)
(Continued)

(52) U.S. Cl.
CPC ... *H04W 52/0232* (2013.01); *H04W 72/0446* (2013.01); *H04W 72/23* (2023.01)

(58) Field of Classification Search
CPC .......... H04W 52/02; H04W 52/0232; H04W 52/0235; H04W 72/23; H04W 72/046;
(Continued)

(56) References Cited

U.S. PATENT DOCUMENTS 9,332,584 B2  5/2016  Verger et al.
9,668,207 B2  5/2017  Ostergaard et al.
(Continued)

FOREIGN PATENT DOCUMENTS

CN   101431790 A   5/2009
CN   103733717 A   4/2014
(Continued)

OTHER PUBLICATIONS

European Search Report for EP Patent Application No. 19942263.5, dated Apr. 5, 2023, 12 pages.
(Continued)

*Primary Examiner* — Shantell L Heiber
(74) *Attorney, Agent, or Firm* — Perkins Coie LLP

(57) ABSTRACT

Methods, systems, and devices for signaling to reduce power consumption of wireless devices in power saving modes are described. An example method for wireless communication includes transmitting, by a network node to a wireless device in communication with the network node, a control information that is based on the wireless device being in a power-saving state that is different from a power-normal state. Another example method for wireless communication includes receiving, by a wireless device from a network node, a control information that is based on the wireless device being in a power-saving state that is different from a power-normal state.

20 Claims, 6 Drawing Sheets

Transmitting, by a network node to a wireless device in communication with the network node, a control information that is based on the wireless device being in a power-saving state that is different from a power-normal state ⌇ 802

(51) Int. Cl.
*H04W 72/0446* (2023.01)
*H04W 72/23* (2023.01)

(58) Field of Classification Search
CPC .......... H04W 72/0446; H04W 72/0453; H04B 10/564; H04B 10/293; H04B 7/0695; H04L 1/08
See application file for complete search history.

(56) References Cited

U.S. PATENT DOCUMENTS

| | | | |
|---|---|---|---|
| 11,146,345 B2 | 10/2021 | Martin | |
| 11,240,794 B2 | 2/2022 | Zhang et al. | |
| 11,963,104 B2 | 4/2024 | Koskinen et al. | |
| 2014/0044056 A1 | 2/2014 | Chen et al. | |
| 2014/0112221 A1 | 4/2014 | Verger et al. | |
| 2015/0282131 A1* | 10/2015 | Nagata | H04W 72/542 370/329 |
| 2016/0077573 A1 | 3/2016 | Lee et al. | |
| 2016/0165547 A1* | 6/2016 | Ouchi | H04L 5/14 455/522 |
| 2017/0251518 A1 | 8/2017 | Agiwal et al. | |
| 2017/0339641 A1 | 11/2017 | Nigam et al. | |
| 2018/0227102 A1* | 8/2018 | John Wilson | H04L 5/001 |
| 2018/0294859 A1 | 10/2018 | Niu et al. | |
| 2019/0260544 A1* | 8/2019 | Dou | H04L 5/0048 |
| 2019/0327767 A1 | 10/2019 | Islam et al. | |
| 2020/0029315 A1* | 1/2020 | Lin | H04W 24/08 |
| 2020/0037248 A1* | 1/2020 | Zhou | H04L 5/0048 |
| 2020/0053649 A1 | 2/2020 | Yao et al. | |
| 2020/0076487 A1 | 3/2020 | Liu et al. | |
| 2020/0229093 A1 | 7/2020 | Ahmad et al. | |
| 2020/0313833 A1 | 10/2020 | Yi et al. | |
| 2021/0037484 A1 | 2/2021 | Zhou et al. | |
| 2021/0051640 A1 | 2/2021 | Pao et al. | |
| 2021/0203468 A1 | 7/2021 | Yi et al. | |
| 2021/0377852 A1 | 12/2021 | Zhou et al. | |
| 2022/0006599 A1 | 1/2022 | Wang et al. | |
| 2023/0247557 A1 | 8/2023 | Zhao | |

FOREIGN PATENT DOCUMENTS

| | | |
|---|---|---|
| CN | 106664634 A | 5/2017 |
| CN | 109391445 A | 2/2019 |
| CN | 109511139 A | 3/2019 |
| WO | 2018/082402 A1 | 5/2018 |
| WO | 2018/204799 A1 | 11/2018 |

OTHER PUBLICATIONS

VIVO, "PDCCH-based power saving signal/channel design," 3GPP TSG RAN WG1 #96bis, R1-1904103, Xi'an, China, Apr. 8-12, 2019, 7 pages.

QUALCOMM Incorporated, "Potential Techniques for UE Power Saving," 3GPP TSG-RAN WG1 #96, R1-1903016, Athens, Greece, Feb. 25-Mar. 1, 2019, 33 pages.

QUALCOMM Incorporated, "UE Adaptation to the Traffic and UE Power Consumption Characteristics," 3GPP TSG-RAN WG1 Ad-Hoc Meeting 1901, R1-1900911, Taipei, Taiwan, Jan. 21-25, 2019, 24 pages.

Indian First Examination Report issued in IN Patent Application No. 202247011553, dated Jan. 17, 2024, 6 pages.

International Search Report and Written Opinion mailed on May 20, 2020 for International Application No. PCT/CN2019/101226, filed on Aug. 17, 2019 (6 pages).

CMCC, "Discussion on PDCCH-based power saving signal/channel design," 3GPP TSG RAN WG1 #97, Reno, USA, R1-1906524, 10 pages, May 13-17, 2019.

International Search Report and Written Opinion mailed on Apr. 26, 2020 for International Application No. PCT/CN2019/101227, filed on Aug. 17, 2019 (7 pages).

Huawei et al., "PDCCH based power saving signal/channel," 3GPP TSG RAN WG1 Meeting #96bis, Xi'an, China, R1-1903988, 7 pages, Apr. 8-12, 2019.

ZTE, "Discussion on PDCCH-based power saving signal," 3GPP TSG RAN WG1 #97, Reno, USA, R1-1906639, 12 pages, May 13-17, 2019.

European Search Report for EP Patent Application No. 19942118.1, dated Mar. 23, 2023, 8 pages.

VIVO, "PDCCH-based power saving signal/channel," 3GPP TSG RAN WG1 #97, R1-1906170, Reno, USA, May 13-17, 2019, 10 pages.

MCC Support, "Draft Report of 3GPP TSG RAN WG1 #97 v0.2.0," 3GPP TSG RAN WG1 Meeting #98, R1-190xxxx, Prague, Czech Republic, Aug. 26-30, 2019, 157 pages.

Chinese Notification to Complete Formalities of Registration issued in CN Patent Application No. 201980099475.1, dated May 26, 2023, 6 pages. English translation included.

Chinese Notification to Complete Formalities of Registration issued in CN Patent Application No. 201980099479X, dated Oct. 28, 2023, 4 pages. English translation included.

Canadian office action issued in CA Patent Application No. 3,151,676, dated Nov. 27, 2023, 5 pages.

Chinese office action issued in CN Patent Application No. 2019800994751, dated Feb. 10, 2023, 10 pages. English translation included.

Chinese office action issued in CN Patent Application No. 201980099479.X, dated May 6, 2023, 10 pages. English translation included.

United States Non-Final Office Action issued in related co-pending U.S. Appl. No. 17/673,684, dated Apr. 24, 2024, 11 pages.

United States Final Office Action issued in related co-pending U.S. Appl. No. 17/673,684, dated Aug. 15, 2024, 12 pages.

United States Advisory Action issued in related co-pending U.S. Appl. No. 17/673,684, dated Oct. 23, 2024, 2 pages.

United States Non-Final Office Action issued in related co-pending U.S. Appl. No. 17/673,684, dated Nov. 15, 2024, 11 pages.

Canadian office action issued in CA Patent Application No. 3,151,676, dated Dec. 6, 2024, 4 pages.

* cited by examiner

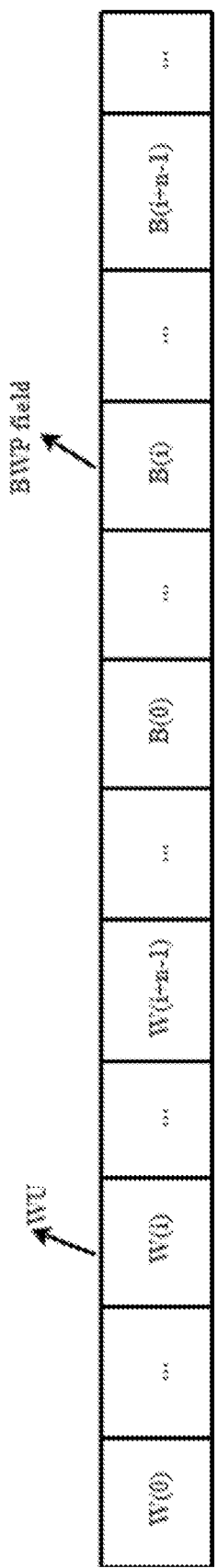
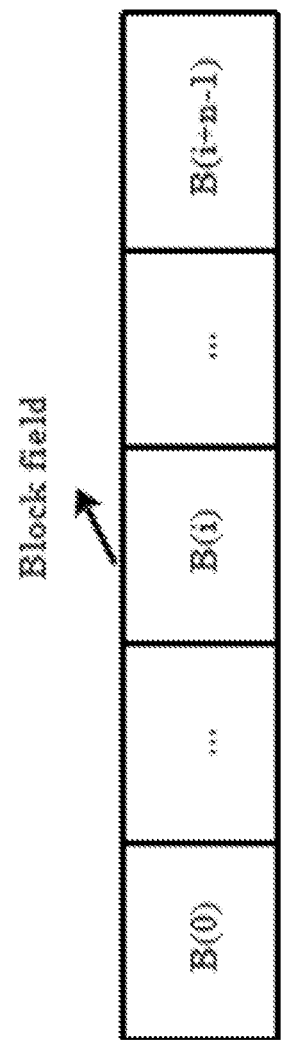
FIG. 4
FIG. 5

SIGNALING METHODS FOR REDUCING POWER CONSUMPTION OF WIRELESS DEVICES IN POWER-SAVING MODES

CROSS-REFERENCE TO RELATED APPLICATIONS

This application is a continuation of International Patent Application No. PCT/CN2019/101227, filed on Aug. 17, 2019, the contents of which are incorporated herein by reference in their entirety.

TECHNICAL FIELD

This document is directed generally to wireless communications.

BACKGROUND

The rapid growth of wireless communications and advances in technology has led to greater demand for capacity and connectivity. Other aspects, such as energy consumption, device cost, spectral efficiency, and latency are also important to meet the needs of various communication scenarios. In comparison with the existing wireless networks, next generation systems and wireless communication techniques will need to support for an increased number of users and devices, as well as support for higher data rates.

SUMMARY

This document relates to methods, systems, and devices of reducing the power consumption of wireless devices in power saving modes.

In one exemplary aspect, a wireless communication method is disclosed. The method includes transmitting, by a network node to a wireless device in communication with the network node, a control information that is based on the wireless device being in a power-saving state that is different from a power-normal state.

In another exemplary aspect, a wireless communication method is disclosed. The method includes receiving, by a wireless device from a network node, a control information that is based on the wireless device being in a power-saving state that is different from a power-normal state.

In some embodiments, the method may preferably include the power-normal state is a discontinuous reception (DRX) state that comprises a DRX active time or a running DRX_on duration timer or DRX is not configured.

In some embodiments, the method may preferably include that the control information comprises a downlink control information (DCI).

In some embodiments, the method may preferably include that the control information comprises at least one of a wake-up indicator, an offset of a time-domain resource allocation indication, a bandwidth part (BWP) indicator, a maximum multiple-input multiple-output (MIMO) layer indication, a physical downlink control channel (PDCCH) monitoring indication, or a reference signal (RS) resource set indication.

In some embodiments, the method may preferably include that the control information comprises a first bit field and a second bit field.

In some embodiments, the method may preferably include that the first bit field comprises a first code point or wake-up information, and wherein the second bit field comprises an indication of a duration for the wake-up information.

In some embodiments, the method may preferably include that the first bit field comprises a second code point or non-awake information, and wherein the second bit field comprises an indication of a duration for the non-awake information.

In some embodiments, the method may preferably include that the control information is communicated in a first cell or a first cell group, and wherein an information communicated for a second cell or a second cell group is determined by at least one of a cell identification (ID), a location in the control information or a mapping rule.

In some embodiments, the method may preferably include that the control information is communicated in a first cell or a first cell group, and wherein an information communicated for a second cell or a second cell group is determined by at least one of a configured parameter of the first cell or the first cell group, a configured parameter of the second cell or the second cell group, and a modification method.

In some embodiments, the method may preferably include that the control information precedes an uplink or supplementary uplink information field.

In some embodiments, the method may preferably include that the control information precedes a carrier indicator information field.

In some embodiments, the method may preferably include that the control information follows a bandwidth part (BWP) indicator information field.

In some embodiments, the method may preferably include that a signal comprising the control information in multiple monitoring occasions or multiple beams uses the same aggregation level.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 4 shows yet another example of DCI comprising a wake-up indication and a bandwidth part (BWP) field.

FIG. 5 shows yet another example of DCI comprising a block field.

DETAILED DESCRIPTION

With the development of wireless communication technologies, the performance such as transmission rate, delay, throughput, and reliability of wireless communication systems have been greatly improved through technologies such as operation in high-frequency bands (e.g., mm wave), large bandwidths, and multiple antennas. At the same time, the power consumption of the user terminal (UE, or wireless device, or wireless node) will affect the user experience.

Embodiments of the disclosed technology are directed to reducing UE power consumption in a wireless communication system while maintaining system performance. In an example, a physical downlink control channel (PDCCH) can be configured to carry power-saving information or indications.

In some embodiments, UE power saving methods may include time-domain power saving techniques, frequency-domain power saving techniques, and spatial power saving techniques. When the UE is in different states, different power saving techniques may be employed or different indication signaling may be received.

Discontinuous reception (DRX) is a method that is employed in various wireless technologies to allow the UE device to turn its receiver off during periods of inactivity. UEs can be configured to use DRX, where the UE can turn its radio frequency (RF) chain on sporadically. Without DRX configured, the UE would need to monitor the physical downlink control channel (PDCCH) according to search space configuration, that is, keep its RF chain constantly on, resulting in high power consumption.

In an example, different signaling or indication may be used when the UE is in a DRX-off period as compared to the case where DRX may not be configured or when UE is in Active Time or DRX-on period.

Figure 1:
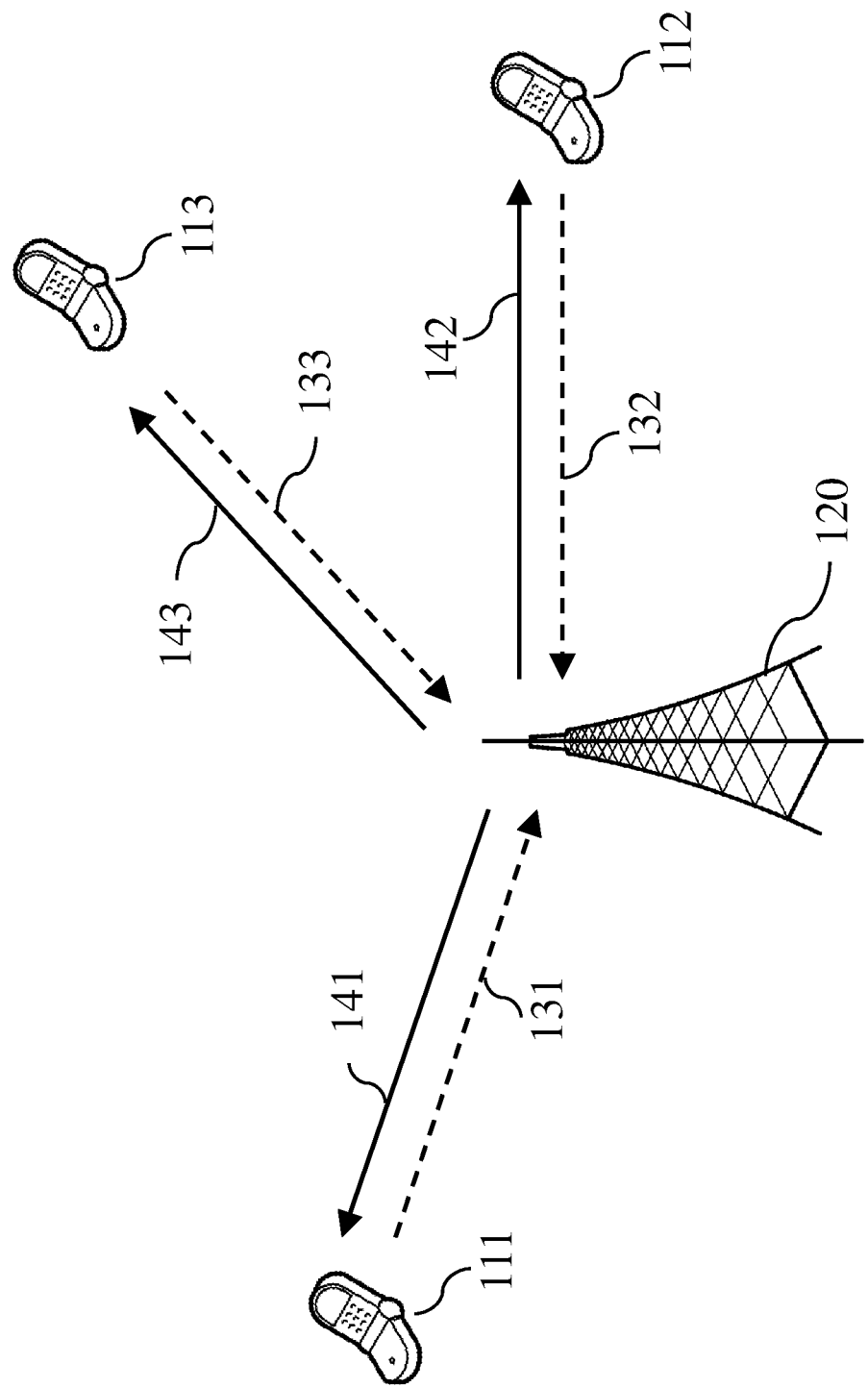
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include downlink control information (DCI) that include one or more indications that are selected based on the state of the respective UE. The UEs perform subsequent communications (131, 132, 133) based on its state (e,g, DRX-on, DRX-off, DRX is not configured, or DRX Active Time). The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used or combined with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Example Implementations and Wireless Device States

In some embodiments, a wireless device (e.g., the UE) may be configured to use discontinuous reception (DRX), which results in the UE being in a DRX-on state or a DRX-off state. On the other hand, a UE may not be configured with DRX.

In an example, when DRX is configured, the Active Time (of the DRX cycle) at least includes the time while:
  drx-onDurationTimer or drx-InactivityTimer or drx-RetransmissionTimerDL or drx-RetransmissionTimerUL or ra-ContentionResolutionTimer is running; or
  a Scheduling Request is sent on PUCCH and is pending; or
  a PDCCH indicating a new transmission addressed to the Cell Radio Network Temporary Identifier (C-RNTI) of the MAC entity has not been received after successful reception of a Random Access Response for the Random Access Preamble not selected by the MAC entity among the contention-based Random Access Preamble.

In some embodiments, a wakeup indication includes either a "wake up" indication and/or a "do not wake up" indication. In an example, a "wake up" indication represents at least one of the following:
  The drx-onDurationTimer needs to be started or restarted in N DRX cycles, or
  The UE needs to monitor the first type of DCI set during the drx-onDurationTimer timing in the N DRX cycles, or
  The UE needs to monitor the PDCCH during the drx-onDurationTimer is running in the N DRX cycles, or
  The UE needs to monitor the first type of DCI set in the N DRX cycles, or
  The UE needs to monitor the PDCCH in the N DRX cycles, or
  The drx-onDurationTimer of N long DRX cycles needs to be started or restarted, or
  The UE needs to monitor the PDCCH during the drx-onDurationTimer of N long DRX cycles is running, or
  While the drx-onDurationTimer of N long DRX cycles is running, the UE needs to monitor the first type of DCI set.

In another example, the "do not wake up" indication represents at least one of the following:
  The drx-onDurationTimer does not need to be started or restarted during N DRX cycles, or
  While the drx-onDurationTimer in N DRX cycles is running, the UE does not need to monitor the first type of DCI set, or
  While the drx-onDurationTimer in N DRX cycles is running, the UE does not need to monitor the PDCCH, or
  The UE does not need to monitor the first type of DCI set in the N DRX cycles, or
  The UE does not need to monitor the PDCCH in the N DRX cycles, or
  The drx-onDurationTimer of N long DRX cycles does not need to be started or restarted, or
  While the drx-onDurationTimer of N long DRX cycles is running, the UE does not need to monitor the first type of DCI set, or
  While the drx-onDurationTimer of N long DRX cycles is running, the UE needs to monitor the PDCCH.

In the above examples, N is a positive integer. In the above examples, the N DRX periods are N DRX periods after the monitoring occasion of wakeup indication.

Examples of Downlink Control Information (DCI) Embodiments

Downlink control information (DCI) is a information which schedules a downlink data channel (e.g, PDSCH) or an uplink data channel (e.g., PUSCH). In some examples, the DCI is of different types based on whether an uplink or a downlink is being scheduled, for either one or multiple cells. In some examples, the DCI is of different types based on the scrambling sequence or scrambled method. In some examples, the DCI is of different types based on the search space. In some examples, the DCI is of different types based on the control resource set (CORESET). In some examples, the DCI is of different types based on the RNTI (radio network temporary identity) type.

In some embodiments, the first type of DCI set is related to at least one of the RNTI that scrambles the DCI, the search space, the control resource set (CORESET) and the subcarrier spacing.

In some embodiments, the first type of DCI set includes at least one of the following characteristics or features:
  Scrambled by C-RNTI, CS-RNTI, MCS-C-RNTI, SP-CSI-RNTI, SFI-RNTI, INT-RNTI, TPC-PUCCH-RNTI, TPC-PUSCH-RNTI, or TPC-SRS-RNTI DCI.
  Includes at least a DCI of the UE-specific search space.
  Includes at least a DCI scrambled by a C-RNTI, a CS-RNTI, an MCS-C-RNTI, or an SP-CSI-RNTI.
  Does not include a DCI whose CORESET is CORESET zero.
  Does not include a DCI whose search space is search space zero.
  Does not include DCI scrambled by TC-RNTI, SI-RNTI, RA-RNTI, PS-RNTI, or P-RNTI.
  Does not include TC-RNTI, SI-RNTI, RA-RNTI, PS-RNTI, P-RNTI, SFI-RNTI, INT-RNTI, TPC-PUCCH-RNTI, TPC-PUSCH-RNTI, or TCI-SRS-RNTI scrambled DCI.

In some embodiments, the first type of DCI set does not include the second type of DCI set.

In some embodiments, the second type of DCI set is related to at least one of the RNTI that scrambles the DCI, the search space, the control resource set (CORESET) and the subcarrier spacing.

In some embodiments, the second type of DCI set includes at least one of the following characteristics or features:
  Includes at least a DCI in which the search space is a common search space.
  Includes at least a DCI that is a Type 0-PDCCH common search space set.
  Includes at least a DCI that is a Type0A-PDCCH common search space set.
  Includes at least a DCI that is a Type 1-PDCCH common search space set.
  Includes at least a DCI that is a Type 2 PDCCH common search space set.
  Includes a DCI whose CORESET is CORESET zero.
  Includes a DCI whose search space is search space zeros.
  Scrambled by TC-RNTI, SI-RNTI, RA-RNTI, PS-RNTI, or P-RNTI.
  Includes TC-RNTI, SI-RNTI, RA-RNTI, PS-RNTI, P-RNTI, SFI-RNTI, INT-RNTI, TPC-PUCCH-RNTI, TPC-PUSCH-RNTI, or TCI-SRS-RNTI scrambled DCI.

In some embodiments, the PS-RNTI can be used for power saving of the UE, or the PS-RNTI is used to scramble the first signaling or the second signaling (e.g., different indications that are transmitted based on the state of the UE). In other embodiments, the PS-RNTI scrambled DCI may carry a wake-up indication. In some examples, the second type of DCI set may include
  DCI scrambled by the TC-RNTI, or
  DCI scrambled by the SI-RNTI, or
  DCI scrambled by the RA-RNTI, or
  DCI scrambled by the PS-RNTI, or
  DCI scrambled by the PS-RNTI.

In some embodiments, the TC-RNTI (Temporary C-RNTI) can be used for a RACH (random access channel) or a random access procedure, the SI-RNTI is used for a broadcast system message, the RA-RNTI can be used for a random access response (Random Access Response), and the PS-RNTI is used to scramble the UE power saving information. If the UE does not monitor all or part of the RNTI scrambled DCI for a long period of time, the performance and latency of the communication system may be seriously affected. Therefore, the wakeup indication does not affect UE's activities of monitoring the TC-RNTI, the SI-RNTI, the RA-RNTI, or PS-RNTI scrambled DCI. Furthermore, the wake-up indication does not affect the UE's activities of monitoring the second type of DCI set.

In some embodiments, the wakeup indication may be carried by the second signaling.

Examples of Time-Domain Resource Allocation Embodiments

In some embodiments, the offset of a time-domain resource allocation indication includes at least one of a minimum timeoffset K0, a minimum time offset K1, a minimum time offset K2, a minimum aperiodic CSI-RS offset, and a minimum aperiodic SRS offset.
  For example,
  The time offset K0 represents a slot offset between the DCI and its scheduled PDSCH
  The time offset K2 represents a slot offset between the DCI and its scheduled PUSCH
  The time offset K1 represents a slot offset between the PDSCH and its HARQ-ACK feedback
  The aperiodic CSI-RS offset represents a slot offset between a DCI including a triggering aperiodic CSI-RS resource set and a triggered aperiodic CSI-RS resource set
  The aperiodic SRS offset represents a slot offset between a DCI that includes a triggering aperiodic SRS resource set and a set of aperiodic SRS resources In some embodiments, the minimum time-domain resource offset indication may be carried by the first signaling. In other embodiments, the minimum time-domain resource offset indication may be carried by the second signaling.

Examples of Bandwidth Part (BWP) Embodiments

Bandwidth parts (BWPs) enable more flexibility in how resources are assigned in a given carrier. For example, bandwidth parts enable multiplexing of different signals and signal types for better utilization and adaptation of spectrum and UE power.

In some embodiments, signaling BWP information includes the state(s) of the bandwidth part. In some embodiments, the states includes an active state, an inactive state, or a dormant state. In some embodiments, the states includes an active state or a dormant state. In some embodiments, the states includes an inactive state or a dormant state.

Bandwidth part indicator. In some embodiments, the indicator indicates the active bandwidth part (Active BWP). In some embodiments, the indicator indicates the dormant bandwidth part (BWP).

In some embodiments, the BWP indication may be carried by the first signaling or the second signaling.

Example 1. In some embodiments, if the UE receives or detects the first or second signaling indication, or before the first or second signaling is valid, if the condition A-1 is met, the first or second signaling triggers or activates a reference signal resource set or reporting resource configuration.

In other embodiments, the first or second signaling triggers or activates a reference signal resource set or reporting resource configuration.

In some embodiments, the first or second signaling includes BWP information. The BWP information includes switching to a dormant BWP or switching to a BWP dormant state.

In this example, the condition A-1 satisfies at least one of the following:

The periodic CSI-RS is not configured on the dormant or target BWP or the active BWP, No periodic CSI report is configured on the dormant or target BWP or the active BWP, No semi-persistent CSI-RS is configured or activated on the dormant BWP or the target BWP or the active BWP, or No semi-persistent CSI reporting is configured or activated on the dormant BWP or the target BWP or the active BWP.

In some embodiments, if the condition A-1 is met, the first signaling or the second signaling triggers or activates the CSI reporting. Herein, the time domain behavior of CSI reporting is semi-persistent.

In some embodiments, if the condition A-1 is met, the first signaling or the second signaling triggers or activates the CSI-RS set. Herein, the time domain behavior of CSI-RS set is semi-persistent.

In some embodiments, the CSI reporting mode is semi-persistent CSI reporting.

In some embodiments, the CSI-RS resource set is a semi-persistent CSI-RS resource set.

In some embodiments, the DCI carrying the second signaling is scrambled by the PS-RNTI.

In some embodiments, the DCI carrying the first signaling is scrambled by the SP-CSI-RNTI. In other embodiments, the DCI carrying the first signaling is an uplink scheduling DCI.

In some embodiments, if the UE has an active periodic CSI-RS/CSI-IM resource configuration, if the corresponding activated BWP is switched to the dormant state, the resource configuration is still active.

In some embodiments, if the UE has or an active periodic ZP CSI-RS resource set configuration, if the corresponding activated BWP is switched to the dormant state, the resource configuration is still active.

By configuring periodic or semi-persistent CSI measurement and reporting in the dormant BWP or the dormant state, the PDCCH monitoring power consumption on the serving cell can be reduced, and UE can quickly switches to the active BWP or active state to receive or transmits data.

In some embodiments, if part of the bandwidth information indicated by the first or second signaling includes switching to a dormant BWP or switching to a BWP dormant state, the UE may ignore a part of the information field in the first or second signaling indication.

In some embodiments, if part of the bandwidth information indicated by the first or second signaling includes switching to a dormant BWP or switching to a BWP dormant state, part of information fields in the first or second signaling indication is the all zeros or all 1's state.

In some embodiments, a part of the information field of the first signaling or the second signaling indication is a specific state, and the BWP corresponding to the BWP indicator is indicated as a dormant state. In an example, the specific state is the all 0 or the all 1 state.

In some embodiments, the part of the information field of the first or second signaling indication includes a redundancy version of the information field, a modulating and coding scheme (MCS) information field, or frequency resource domain assignment information field.

In some embodiments, the indication information in the first signaling or the second signaling is for one of the following operations:

Switch to a dormant BWP or switch to a BWP dormant state;

Switch out of the dormant BWP or switch out of the BWP dormant state;

Switch the BWP from dormant state to the active state.

In these examples, the BWP indication information in the first signaling or the second signaling is applicable to uplink and downlink operations. In these examples, the uplink and downlink operations are bundled.

In some embodiments, if the indication information in the first signaling or the second signaling includes switching to the dormant BWP, UE switches to the dormant BWP for both the uplink and the downlink operation. The uplink dormant BWP and the downlink dormant BWP have one of the following characteristics: the same ID, a BWP having a minimum ID or an ID of 0.

In some embodiments, if the indication information in the first signaling or the second signaling includes switching to the BWP dormant state, UE switches both the uplink BWP and the downlink BWP to a dormant state.

In some embodiments, if the indication information in the first signaling or the second signaling includes switching out of the dormant BWP, UE switches both the uplink and the downlink switch out of the dormant BWP. Among them, UE switches the uplink BWP to the BWP whose ID is firstActiveUplinkBWP-Id or 0 or the minimum value. UE switches the downlink BWP to the BWP whose ID is firstActiveDownlinkBWP-Id or 0 or the minimum value. Alternatively, UE switches the uplink and downlink BWP to the most recently activated non-dormant BWP. Alternatively, UE switches the uplink and downlink BWP to the BWP with the largest ID.

In some embodiments, if the indication information in the first signaling or the second signaling includes switching out of the BWP dormant state, or switching the BWP from dormant state to the active state, UE switches both the uplink and uplink BWPs to the active state.

Example of MIMO Layer Embodiments

Embodiments of the disclosed technology support massive multiple-input multiple-output (MIMO) operation, which can significantly increase the system throughput. Massive MIMO can support multiple MIMO layers, each of which is a data stream that is assigned to a user with the layers being orthogonally separated in the space domain (with pre-coding ensuring that there is no cross-layer interference).

In some embodiments, the MIMO layer information includes one or more of the following:

The maximum MIMO layer indication that indicates the maximum number of MIMO layers used to transmit PDSCH or PUSCH. In some embodiments, the maximum number of MIMO layers is the layer that the UE does not expect to receive the PDSCH or transmit the PUSCH.

Example 1. In some embodiments, the maximum MIMO layer is indicated by a bandwidth part indication. In some example, each BWP or at least one BWP could be configured with a maximum MIMO layer. Adaptation of the maximum MIMO layer can be implemented via BWP switching.

For example, the configuration information of the UE includes at least one of a first type of maximum MIMO layer, and/or a second type of maximum MIMO layer. The first type of maximum MIMO layer (for example, L1_D and/or L1_U) is a cell specific parameter. The second type of maximum MIMO layer (for example, L2_D and/or L2_U) is a BWP specific parameter.

The cell specific parameter represents that the parameter is applicable to downlink and/or uplink scheduling of all BWPs of the UE in the cell. Alternatively, the cell specific parameter represents that the parameter is applicable to the UE in the downlink and/or uplink scheduling of the BWP of the second type of parameters that are not configured or valid in the cell. Alternatively, the cell specific parameter represents that the parameter is applicable to downlink and/or uplink scheduling of the BWP other than a first type of BWP of the UE in the cell.

In some embodiments, the BWP specific parameter represents that the parameter is applicable to downlink and/or uplink scheduling of the UE in the BWP in which the second parameter is configured or valid or a first type of BWP. In some embodiments, the BWP specific parameter indicates that the parameter is applicable to downlink and/or uplink scheduling of the UE in the BWP.

In some embodiments, the first type of maximum MIMO layer L1_D is applicable to downlink scheduling of all BWPs of the UE in the cell. Alternatively, the first type of maximum MIMO layer L1_D is applicable to BWP in which the second type of parameters are not configured or valid of the UE in the cell. Alternatively, the first type of the maximum MIMO layer L1_D is applicable to the downlink scheduling of the BWP of the UE other than the first type of BWP in the cell.

In some embodiments, the second type of maximum MIMO layer L2_D is applicable to downlink scheduling of the UE in the BWP in which the second type of maximum MIMO layer L2_D is configured or valid or a first type of BWP. In some embodiments, the second type of maximum MIMO layer L2_D is applicable to downlink and/or uplink scheduling of the UE in the BWP.

In some embodiments, the first type of maximum MIMO layer L1_U is applicable to uplink scheduling of all BWPs of the UE in the cell, or the first type of maximum MIMO layer L1_U is applicable to BWP of which the second type of parameters is not configured or valid. In some embodiments, the maximum MIMO layer L1_U of the first type is applicable to the uplink scheduling of the BWP of the UE other than a first type of BWP in the cell.

In some embodiments, the second type of maximum MIMO layer L2_U is applicable to uplink scheduling of the UE in the BWP in which the second type of maximum MIMO layer L2_U is configured or valid or a first type of BWP. In some embodiments, the second type of maximum MIMO layer L2_U is applicable to downlink and/or uplink scheduling of the UE in the BWP.

In these examples, the first type of BWP includes at least one of a default BWP, an initial BWP, a BWP with the minimum ID or a dormant BWP.

The dormant BWP includes at least one of the following features:
no need to monitor the PDCCH,
need to measure CSI,
need to perform beam management, or
no need for uplink or downlink data transmission.

In some embodiments, the UE does not expect the second type of maximum MIMO layer L2_D to be greater than the first type of maximum MIMO layer L1_D.

In some embodiments, if the second type of maximum MIMO layer L2_D is not configured, then the number of PDSCH scheduling layers of all BWPs in the cell cannot exceed the first type of maximum MIMO layer L1_D.

In some embodiments, if the first type of maximum MIMO layer L1_D is not configured, and if the second type of maximum MIMO layer L2_D is configured on the first type of BWP, then the number of layers of the PDSCH scheduling in the first type of BWP cannot exceed the second type of maximum MIMO layer indication L2_D.

In some embodiments, if the first type of the maximum MIMO layer L1_D is configured, and if the second type of the maximum MIMO layer L2_D is configured on the first type of BWP, then the number of layers of the PDSCH scheduling in the first type of BWP cannot exceed the second type of maximum MIMO layer L2_D.

In some embodiments, if the second type of the maximum MIMO layer L2_D is configured on the first BWP, then the number of layers of the PDSCH scheduling in the first type of BWP cannot exceed the second type of maximum MIMO layer L2_D.

In some embodiments, if the first type of maximum MIMO layer L1_D and the second type of maximum MIMO layer indication L2_D are configured, then the number of layers of the PDSCH scheduling in the first type of BWP cannot exceed the second type of maximum MIMO layer indication L2_D.

In some embodiments, the UE does not expect the second type of maximum MIMO layer L2_U to be greater than the first type of maximum MIMO layer indication L1_U.

In some embodiments, if the second type of maximum MIMO layer indication L2_U is not configured, then the number of layers of PUSCH scheduling of all BWPs in the cell may not exceed the first type of maximum MIMO layer indication L1_U.

In some embodiments, if the first type of maximum MIMO layer L1_U is not configured, and if the second type of maximum MIMO layer indication L2_U is configured on the first BWP, then the number of layers of the PUSCH scheduling in the first type of BWP cannot exceed the second type of maximum MIMO layer L2_U.

In some embodiments, if the first type of the maximum MIMO layer L1_U is configured, and if the second type of the maximum MIMO layer L2_U is configured on the first BWP, then the number of layers of the PUSCH scheduling in the first type of BWP cannot exceed the second type of maximum MIMO layer indication L2_U.

In some embodiments, if the second type of the maximum MIMO layer L2_U is configured on the first BWP, then the number of layers of the PUSCH scheduling in the first type of BWP cannot exceed the second type of maximum MIMO layer L2_U.

In some embodiments, if the first type of maximum MIMO layer L1_U and the second type of maximum MIMO layer L2_U are configured, then the number of layers of the PUSCH scheduling in the first type of BWP cannot exceed the second type of maximum MIMO layer L2_U.

In some embodiments, for the first type of BWP, if the second type of maximum MIMO layer L2_U is configured, then the maximum rank is the same as the second type of maximum MIMO layer L2_U.

In some embodiments, if the first type of maximum MIMO layer indication L1_U is configured, and if the second type of maximum MIMO layer L2_U is not configured for the first BWP, then the maximum rank is the same as the first type of maximum MIMO layer indication L1_U.

In some embodiments, the maximum rank is a BWP specific parameter. In some embodiments, the maximum rank is used for non-codebook based transmission.

In some embodiments, if the second type of maximum MIMO layer is only configured on a default BWP (default BWP) and/or an initial BWP (initial BWP), then the second type of maximum MIMO layer indication is only for a default BWP and/or an initial BWP.

In some embodiments, the configuration or range of values of the first type of maximum MIMO layer indication (e.g., L1_D and/or L1_U) is related to at least one of the following factors: cell type, frequency range, link direction, or subcarrier spacing.

In an example, the first type of the maximum MIMO layer of the special cell (SpCell, Special Cell) may be different from other cells. In another example, the first type of the maximum MIMO layer of the special cell (SpCell, Special Cell) is not less than other cells. In yet another example, the first type of the maximum MIMO layer of the primary cell (Pcell, primary cell) may be different from other cells. In yet another example, the first type of the maximum MIMO layer of the primary cell (Pcell, primary cell) is not smaller than other cells.

In an example, the first type of maximum MIMO layer of frequency range 2 (FR2, frequency range 2) may be different from frequency range 1 (FR1, frequency range 1). In another example, the first type of frequency range 2 (FR2, frequency range 2) is the largest. In yet another example, The number of MIMO layers is not less than frequency range 1 (FR1, frequency range 1).

In some embodiments, the configuration or range of values of the second type of the maximum MIMO layer indication (e.g., L2_D and/or L2_U) is related to at least one of the following factors: BWP type, frequency range, link direction, or subcarrier spacing.

In an example, the second type of maximum MIMO layer of a first type of BWP may be different from other BWP. In another example, the second type of maximum MIMO layer of a first type of BWP is not greater than other BWP.

In yet another example, the second type of maximum MIMO layer of frequency range 2 (FR2, frequency range 2) may be different from frequency range 1 (FR1, frequency range 1). In yet another example, the second type of maximum MIMO layer of frequency range 2 (FR2, frequency range 2) is not less than frequency range 1 (FR1, frequency range 1).

In some embodiments, if the configuration parameter of the UE includes the second type of maximum MIMO layer indication, then the maximum MIMO layer indication may be indicated by the BWP switching indication. In other embodiments, the BWP switching indication may be carried by the first signaling and/or the second signaling.

Example 2. In some embodiments, the second type of maximum MIMO layer may be a maximum MIMO layer set (or list).

In some embodiments, the configuration information of the UE includes at least one of a first type of maximum MIMO layer L1_D and/or L1_U, a second type of maximum MIMO layer set L2_D_set and/or L2_U_set, or a second type of maximum MIMO layer indication.

In some embodiments, the second type of maximum MIMO layer set (for example, L2_D_set and/or L2_U_set) is a BWP specific parameter. For example, the maximum MIMO layer indication may be carried by the first signaling and/or the second signaling.

In some embodiments, the first type of maximum MIMO layer L1_D is applicable to downlink scheduling of all BWPs of the UE in the cell. In some embodiments, the first type of maximum MIMO layer L1_D is applicable to the UE in the cell. In some embodiments, the downlink scheduling of the BWP of the second type of the maximum MIMO layer set is not configured or valid. In some embodiments, the first type of the maximum MIMO layer indication L1_D is applicable to the downlink scheduling of the BWP of the UE other than a first type of BWP in the cell. In some embodiments, the first type of maximum MIMO layer indication L1_D is applicable for BWP of a second type of parameter set is configured, but does not receive or detect a maximum MIMO layer indication. In some embodiments, the first type of maximum MIMO layer indication L1_D is applicable to the UE of a first type of BWP in the cell, but does not receive or detect the a maximum MIMO layer indication, or the a maximum MIMO layer indication does not take effect.

In some embodiments, the second type of maximum MIMO layer set L2_D_set may be used for downlink scheduling of the UE in the BWP or a first type of BWP. In some embodiments, the maximum MIMO layer indication is further used to indicate downlink scheduling. The maximum MIMO layer indication may be carried by the first signaling and/or the second signaling. The maximum MIMO layer indication indicated by the first signaling and/or the second signaling may indicate scheduling on one or more cells.

In some embodiments, if the configuration parameter of the UE includes the first type of maximum MIMO layer L1_D and the second type of maximum MIMO layer set L2_D_set, but the maximum MIMO layer indication is not received or detected, or the maximum MIMO layer indication is not valid, then the maximum number of MIMO layers for scheduling the PDSCH is the first type of maximum MIMO layer indication L1_D.

In some embodiments, the first type of maximum MIMO layer indication L1_U is applicable to uplink scheduling of all BWPs of the cell. In some embodiments, the first type of maximum MIMO layer indication L1_U is applicable to the BWP other than a first type of BWP. In some embodiments, the first type of maximum MIMO layer indication L1_U is applicable to the uplink scheduling of the BWP of the second type of the maximum MIMO layer set is not configured. In some embodiments, the first type of maximum MIMO layer indication L1_U is is applicable to the BWP of a second type of parameter set is configured, but does not receive or detect a maximum MIMO layer indication, or a maximum MIMO layer indication is not valid. In some embodiments, the first type of maximum MIMO layer indication L1_U is applicable to the UE that does not receive or detect the maximum MIMO layer indication in a first type of BWP in the cell, or the maximum MIMO layer indication indicates an invalid maximum MIMO layer indication.

In some embodiments, the first type of maximum MIMO layer indication L1_D is applicable to downlink scheduling of all BWPs of the cell. In some embodiments, the first type of maximum MIMO layer indication L1_D is applicable to the BWP other than a first type of BWP. In some embodiments, the first type of maximum MIMO layer indication L1_D is applicable to the downlink scheduling of the BWP of the second type of the maximum MIMO layer set is not configured. In some embodiments, the first type of maximum MIMO layer indication L1_D is is applicable to the BWP of a second type of parameter set is configured, but does not receive or detect a maximum MIMO layer indication, or a maximum MIMO layer indication is not valid. In some embodiments, the first type of maximum MIMO layer indication L1_D is applicable to the UE that does not receive or detect the maximum MIMO layer indication in a first type of BWP in the cell, or the maximum MIMO layer indication indicates an invalid maximum MIMO layer indication.

In some embodiments, the second type of maximum MIMO layer set L2_U_set may be used for uplink scheduling of the UE in the BWP or a first type of BWP. In some embodiments, the maximum MIMO layer is further used to indicate uplink scheduling. The maximum MIMO layer indication may be carried by the first signaling and/or the second signaling. The maximum MIMO layer indication indicated by the first signaling and/or the second signaling may indicate scheduling on one or more cells.

In some embodiments, the second type of maximum MIMO layer set L2_D_set may be used for downlink scheduling of the UE in the BWP or a first type of BWP. In some embodiments, the maximum MIMO layer is further used to indicate downlink scheduling. The maximum MIMO layer indication may be carried by the first signaling and/or the second signaling. The maximum MIMO layer indication indicated by the first signaling and/or the second signaling may indicate scheduling on one or more cells.

In some embodiments, if the configuration parameter of the UE includes the second type of maximum MIMO layer set L2_D_set, and the maximum MIMO layer indication is not received or detected, or the maximum MIMO layer indication is not valid, then the number of layers of the PDSCH scheduling cannot exceed the maximum MIMO layer indication L1_D of the first type, or the minimum value of the second maximum MIMO layer set L2_D_set, or the maximum value of the second maximum MIMO layer set L2_D_set, or the maximum number of MIMO layers reported by the UE (capability reporting, or assistance information reporting).

In some embodiments, the UE does not expect the maximum value of the second type of maximum MIMO layer set L2_D_set to be greater than the first type of maximum MIMO layer indication L1_D.

In some embodiments, if the maximum value of the second type of maximum MIMO layer set L2_D_set is not configured, then the number of PDSCH scheduling layers of all BWPs in the cell may not exceed the first type of maximum MIMO layer indication L1_D.

In some embodiments, if the maximum MIMO layer indication or the maximum MIMO layer indication is valid, then the number of PDSCH scheduling layers in the cell with the maximum MIMO layer indication cannot exceed the maximum indicated by the second type of maximum MIMO layer indication.

In some embodiments, if the configuration parameter of the UE includes the first type of maximum MIMO layer L1_U and the second type of maximum MIMO layer set L2_U_set, but the maximum MIMO layer indication is not received or detected, or the maximum MIMO layer indication is not valid, then the maximum number of MIMO layers for scheduling the PUSCH is the first type of maximum MIMO layer indication L1_U, or the minimum value of the second maximum MIMO layer set L2_U_set, or the maximum value of the second maximum MIMO layer set L2_U_set, or the maximum number of MIMO layers reported by the UE (capability reporting, or assistance information reporting).

In some embodiments, the UE does not expect that the maximum value of the second type of maximum MIMO layer set L2_U_set is greater than the first type of maximum MIMO layer indication L1_U.

In some embodiments, if the maximum value of the second type of maximum MIMO layer set L2_U_set is not configured, then the number of layers of PUSCH scheduling of all BWPs in the cell may not exceed the first type of maximum MIMO layer indication L1_U.

In some embodiments, if the maximum MIMO layer indication or the second type maximum MIMO layer indication is valid, then the number of MIMO layers of the PUSCH scheduling cannot exceed the second type of the maximum MIMO layer in the cell with the maximum MIMO layer indication.

In some embodiments, if the configuration parameter of the UE includes the second type of maximum MIMO layer set L2_U_set, and the maximum MIMO layer indication is not received or detected, or the maximum MIMO layer indication is not valid, then the number of MIMO layers of the PUSCH scheduling cannot exceed the maximum of the maximum of MIMO layer L1_U, or the minimum of the second maximum MIMO layer set L2_U_set, or the maximum of the second maximum MIMO layer set L2_U_set, or the maximum number of MIMO layers reported by the UE (capability reporting, or assistance information reporting).

In some embodiments, for the first type of BWP, if the second type of maximum MIMO layer set L2_U_set is configured, then the maximum rank number is equal to the maximum value of the second type of maximum MIMO layer set L2_U_set;

In some embodiments, if the first type of maximum MIMO layer indication L1_U is configured, and if the second type of maximum MIMO layer set L2_U_set is not configured for the first BWP, then the maximum rank number is the same as the first type of maximum MIMO layer L1_U.

In some embodiments, for a particular BWP or any configured BWP, if the second type of maximum MIMO layer set L2_U_set is configured, then the maximum rank number is equal to the maximum value of the second type of maximum MIMO layer set L2_U_set;

In some embodiments, the second type of maximum MIMO layer set is only configured on a default BWP and/or an initial BWP. In some embodiments, the second type of maximum MIMO layer set is only for a default BWP and/or the initial BWP is valid;

In some embodiments, the configuration or range of values of the first type of maximum MIMO layer (eg, L1_D and/or L1_U) is related to at least one of the following factors: cell type, frequency range, link direction or subcarrier spacing.

In an example, the first type of the maximum MIMO layer of the special cell (SpCell, Special Cell) may be different from other cells. In another example, the first type of the maximum MIMO layer of the special cell (SpCell, Special Cell) is not less than other cells. In yet another example, the first type of the maximum MIMO layer of the primary cell (Pcell, primary cell) may be different from other cells. In yet another example, the first type of the maximum MIMO layer of the primary cell (Pcell, primary cell) is not smaller than other cells.

In an example, the first type of maximum MIMO layer of frequency range 2 (FR2, frequency range 2) may be different from frequency range 1 (FR1, frequency range 1). In another example, the first type of frequency range 2 (FR2, frequency range 2) is the largest. In yet another example, the number of MIMO layers is not less than frequency range 1 (FR1, frequency range 1).

In some embodiments, the configuration or range of values of the second set of maximum MIMO layer sets (eg, L2_D and/or L2_U) is related to at least one of the following factors: BWP type, frequency range link direction, or subcarrier spacing.

In an example, the second type of maximum MIMO layer set of a first type of BWP may be different from other BWP. In another example, the second type of maximum MIMO layer set of a first type of BWP is not greater than other BWP. In yet another example, the second type of maximum MIMO layer set of frequency range 2 (FR2, frequency range 2) may be different from frequency range 1 (FR1, frequency range 1). In yet another example, the second type of maximum MIMO layer set of frequency range 2 (FR2, frequency range 2) is not less than frequency range 1 (FR1, frequency range 1).

In the embodiments described above, the maximum MIMO layer indication may be indicated by the BWP information field, or the first signaling indication and/or the second signaling indication.

In the embodiments described above, the maximum MIMO layer indication may be indicated by L1 (layer 1) signaling (for example, L1 signaling including a BWP information field, or a first signaling indication, or a second signaling indication). In some embodiments, the application delay of L1 signaling is related to at least one of the following factors:
(1) BWP switching delay,
(2) Subcarrier spacing,
(3) Minimum time-domain resource offset,
(4) Predefined delay, and/or
(5) Application delay of other indications.

For an example, if the L1 signaling includes a BWP switching, then the application delay is related to a BWP switching delay. For another example, if the L1 signaling includes a BWP switching, then the application delay is not less than a BWP switching delay. For yet another example, if the L1 signaling includes a BWP switching, then the application delay is a BWP switching delay. For yet another example, if the L1 signaling includes a BWP switch, then the application delay is not less than a maximum value of (T_bwpswithdelay, T_others). For yet another example, if the L1 signaling includes a BWP switch, then the application delay is not less than (The maximum value of T_bwpswithdelay, T_offset). For yet another example, if the L1 signaling includes BWP switching, then the application delay is not less than the maximum value of (T_bwpswithdelay, T_others, T_offset).

In the examples above, T_bwpswithdelay is the BWP switching delay, T_others is an application delay of other indications carried by the L1 signaling, and T_offset is the minimum time domain resource offset.

For an example, if the L1 signaling does not include a BWP switch, then the application delay is not less than a T_offset maximum value. For another example, if the L1 signaling does not include a BWP switch, then the application delay is not less than a maximum value of T_others. In yet another example, if the L1 signaling does not include a BWP switch, then the application delay is not less than a maximum value of (T_offset, T_others).

In some embodiments, the application delay of the L1 signaling is not less than a predefined delay. For example, the predefined delay is related to at least one of the following factors:

(1) subcarrier spacing
(2) Frequency range type (including frequency range 1 and frequency range 2)
(3) UE type (or category)
(4) UE capability
(5) UE assistance information.

Example 3. In some embodiments, indicating the maximum number of MIMO layers can be implemented in at least one of the following:
Joint coded with precoding information and number of layers information;
Joint coded with antenna ports;
Related to the precoding information indicated in the last scheduled DCI;
Related to indicating the number of MIMO layers in the last scheduled DCI; or
Related to the number of indicated antenna ports in the last scheduled DCI.

Example 4-1. In some embodiments, the maximum MIMO layer indication Lmax used for determining the TBS_LBRM (transport block size of limit buffer rate matching) for the uplink is related to at least one of the following factors:
1) the first type of maximum number of MIMO layer indication, or
2) the second type of maximum MIMO layer indication, or the second type of maximum MIMO layer set, or
3) the maximum rank, or
4) the maximum number of MIMO layers supported by the UE, or
5) UE assistance information.

In some embodiments, if condition A-1 is satisfied, then Lmax is a maximum value of the configured first type of maximum MIMO layer indication and the configured second type of maximum MIMO layer or the maximum value of configured second type of maximum MIMO layer set.

In some embodiments, if condition B-1 is satisfied, then Lmax is the maximum number of configured ranks and the maximum value of the configured second type of maximum MIMO layer indication or the maximum value of configured second type of maximum MIMO layer set.

In some embodiments, if condition C-1 is satisfied, then Lmax is the configured maximum MIMO layer of the first type.

In some embodiments, if the condition D-1 is satisfied, then Lmax is the configured second type of maximum MIMO layer indication, or the maximum value of configured second type of maximum MIMO layer set;

In some embodiments, if condition E-1 is satisfied, then Lmax is the configured maximum rank;

In some embodiments, if the condition F-1 is satisfied, then Lmax is the maximum number of MIMO layers supported by the UE.

In some embodiments, if the condition G-1 is satisfied, then Lmax is related to the UE assistance information.

The condition A-1 is at least one of the following:
(1) The first type of maximum MIMO layer is configured; or,
(2) configuring a second type of maximum MIMO layer indication for at least one BWP or a second type of maximum MIMO layer indication set for all BWPs;

The condition B-1 is at least one of the following:
(1) The first type of maximum MIMO indication is not configured; or,
(2) some or all of the BWPs are configured with a second type of maximum MIMO layer indication or a second type of maximum MIMO layer set; or
(3) The maximum ranks is configured for all BWPs;

The condition C-1 is at least one of the following:
(1) The first type of maximum MIMO layer is configured; or,
(2) Some or all of the BWPs are not configured with a second type of maximum MIMO layer indication or a second type of maximum MIMO layer set;

The condition D-1 is at least one of the following:
(1) The first type of maximum MIMO layer indication is not configured; or,
(2) Some or all BWPs are not configured with the maximum ranks; or,
(3) Some or all of the BWPs are configured with a second type of maximum MIMO layer or a second type of maximum MIMO layer set;

The condition E-1 is at least one of the following:
(1) The first type of maximum MIMO layer is not configured; or,
(2) Some or all BWPs are not configured with a second type of maximum MIMO layer or a second type of maximum MIMO layer set, or
(3) The maximum number of Ranks is configured for all BWPs;

The condition F-1 is at least one of the following:
(1) The first type of maximum MIMO layer is not configured; or,
(2) The second type of maximum MIMO layer or the second type of maximum MIMO layer number set is not configured; or
(3) The maximum ranks is not configured; or,
(4) The assistance information reported by the UE includes information about the number of MIMO layers;

The condition G-1 is at least one of the following:
(1) The first type of maximum MIMO layer is not configured; or,
(2) The second type of maximum MIMO layer indication or the second type of maximum MIMO layer set is not configured; or
(3) The maximum ranks is not configured; or,
(4) The assistance information reported by the UE does not include the MIMO layer related information, or the UE does not report the assistance information.

Example 4-2. In some embodiments, the maximum MIMO layer indication Lmax used for determining the TBS_LBRM (transport block size of limit buffer rate matching) for the downlink is related to at least one of the following factors:
1) the first type of maximum number of MIMO layer indication; or,
2) the second type of maximum MIMO layer indication, or the second type of maximum MIMO layer set; or,
3) the maximum number of MIMO layers supported by the UE; or,
4) UE assistance information.

In some embodiments, if condition A-2 is satisfied, then Lmax is a maximum value of the configured first type of maximum MIMO layer and the configured second type of maximum MIMO layer or the maximum value of configured second type of maximum MIMO layer set;

In some embodiments, if condition B-2 is satisfied, then Lmax is the configured maximum MIMO layer indication of the first type;

In some embodiments, if condition C-2 is satisfied, then Lmax is the configured second type of maximum MIMO layer indication, or the maximum value of configured second type of maximum MIMO layer set;

In some embodiments, if condition D-2 is satisfied, then Lmax is the maximum number of MIMO layers supported by the UE;

In some embodiments, if condition E-2 is satisfied, then Lmax is related to the UE assistance information.

The condition A-2 is at least one of the following:
(1) The first type of maximum MIMO layer is configured; or,
(2) configuring a second type of maximum MIMO layer indication for at least one BWP or a second type of maximum MIMO layer set for all BWPs;

The condition B-2 is at least one of the following:
(1) The first type of maximum MIMO layer is configured; or,
(2) Some or all of the BWPs are not configured with a second type of maximum MIMO layer indication or a second type of maximum MIMO layer set;

The condition C-2 is at least one of the following:
(1) The first type of maximum MIMO layer is not configured; or,
(2) Some or all of the BWPs are configured with a second type of maximum MIMO layer indication or a second type of maximum MIMO layer set;

The condition D-2 is at least one of the following:
(1) The first type of maximum MIMO layer is not configured; or,
(2) The second type of maximum MIMO layer indication or the second type of maximum MIMO layer set is not configured; or
(3) The assistance information reported by the UE includes information about the number of MIMO layers;

The condition E-2 is at least one of the following:
(1) The first type of maximum MIMO layer is not configured; or,
(2) The second type of maximum MIMO layer indication or the second type of maximum MIMO layer set is not configured; or
(3) The assistance information reported by the UE does not include the MIMO layer number related information, or the UE does not report the assistance information.

Example 4-3. In some embodiments, the number of bits of the non-codebook based SRS resource indication is related to the maximum MIMO layer indication Lmax, wherein the maximum MIMO layer indication Lmax is related to at least one of the following factors:
1) the first type of maximum number of MIMO indication; or,
2) the second type of maximum MIMO layer indication, or the second type of maximum MIMO layer set; or,
3) the maximum number of MIMO layers supported by the UE;

In some embodiments, if the condition A-3 is satisfied, then Lmax is the maximum MIMO layer indication of the first type; or In some embodiments, if condition B-3 is satisfied, then Lmax is the maximum MIMO layer indication of the second type, or the maximum value of the second type of maximum MIMO layer set, or the valid maximum MIMO layer indication of the second type of maximum MIMO layer set.

In some embodiments, if condition C-3 is satisfied, then Lmax is the maximum number of MIMO layer indications supported by the UE;

The condition A-3 is at least one of the following:
(1) The first type of maximum MIMO layer is configured; or,
(2) the active BWP is configured with a second type of maximum MIMO layer indication or a second type of maximum MIMO layer set; or, does not receive or detect the maximum MIMO layer indication information for the active BWP; or the MIMO layer number indication information of the active BWP is not valid;

The condition B-3 is at least one of the following:
(1) The first type of maximum MIMO layer is not configured; or,
(2) the active BWP is configured with a second type of maximum MIMO layer indication or a second type of maximum MIMO layer set; or, receives or detects a maximum MIMO layer indication information for the active BWP; or, the MIMO layer number indication information of the active BWP is valid The condition C-3 is at least one of the following:
(1) The first type of maximum MIMO layer is not configured; or,
(2) the active BWP is not configured with a second type of maximum MIMO layer indication or a second type of maximum MIMO layer set; or, does not receive or detect the maximum MIMO layer indication information for the active BWP; or the MIMO layer number indication information of the active BWP is invalid.

Example 4-5. In some embodiments, the PDCCH monitoring information includes at least one of the following:
Activate or de-activate the PDCCH search space or search space set;
Activate or deactivate cross-carrier scheduling;
Activate or deactivate search space sharing;
Activate or deactivate the PDCCH control resource set (CORESET);
PDCCH monitoring period information;
monitoring period information of the first type of DCI set;
PDCCH monitoring time information in one periodicity;
time information of monitoring the first type of DCI set in one periodicity;
period information of PDCCH skipping;
period information of skipping motoring the first type of DCI set;

In some embodiments, if the search space or the search space set is activated by the first or second signaling, then the UE needs to monitor the PDCCH is based on the search space or the search space set configuration information. Alternatively, if the search space or the search space set is deactivated by the first or second signaling, the UE does not need to monitor the PDCCH with corresponding search space or the search space set configuration information.

In some embodiments, if the CORESET is activated by the first or second signaling, the UE needs to monitor the PDCCH associated with the CORESET. Alternatively, if the CORESET is deactivated by the first or second signaling, the UE does not need to monitor the control resource.

In some embodiments, if the search space or the search space set is activated by the first or second signaling, the UE needs to monitor a first type of DCI set according to the search space or the search space set configuration information. Alternatively, if the search space or the search space set is deactivated by the first or second signaling, the UE does not need to monitor the first type of DCI set with corresponding search space or the search space set configuration information.

In some embodiments, if the CORESET is activated by the first or second signaling, the UE needs to monitor the first type of DCI set associated with the CORESET. Alternatively, if the CORESET is deactivated by the first or second signaling, the UE does not need to monitor the first type of DCI set associated with the CORESET.

In some embodiments, the PDCCH monitoring period information includes at least one of a PDCCH monitoring periodicity indication or a PDCCH monitoring periodicity scaling factor.

In some embodiments, the monitoring period information of first type of DCI set includes at least one of a first type of DCI set monitoring periodicity indication or a first type of DCI set monitoring periodicity scaling factor.

In some embodiments, the PDCCH monitoring time information in one periodicity includes at least one of PDCCH monitoring time information in one periodicity or a scaling factor of PDCCH monitoring time in one periodicity.

In some embodiments, the first type of DCI set monitoring time information in one periodicity includes at least one of a first type of DCI set monitoring time information in one periodicity or a scaling factor of a first type of DCI set monitoring time in one periodicity.

In some embodiments, period information of PDCCH skipping of t1 indicates that the UE does not need to monitor the PDCCH within t1 time after a predetermined time. Herein, t1 is non-negative value.

In some embodiments, period information of skipping motoring the first type of DCI set of t1 information indicates that the UE does not need to monitor the first type DCI set PDCCH within t1 after a predetermined time. Herein, t1 is non-negative value.

Similarly, if the UE does not monitor the TC-RNTI, SI-RNTI, RA-RNTI, or PS-RNTI scrambled PDCCH for a long time, it will seriously affect the communication system performance, latency, etc., so PDCCH monitoring information does not affect the monitoring of TC-RNTI, SI-RNTI, RA-RNTI, or PS-RNTI scrambled DCI. Alternatively, the PDCCH monitoring information does not affect monitoring the second type of DCI set.

In some embodiments, Type0-PDCCH CSS set, Type0A-PDCCH CSS set, Type1-PDCCH CSS set, or Type2-PDCCH CSS set cannot be deactivated by PDCCH monitoring information.

Examples of Reference Signal Resource Set Indications

In some embodiments, the reference signal resource set includes at least one of the SRS or the CSI-RS. In an example, the CSI-RS includes TRS (CSI-RS for tracking).

In some embodiments, the reference signal resource set indication may be indicated by the first signaling or the second signaling.

In some embodiments, the cell associated with the reference signal resource set indicated by the first signaling or the second signaling is activated.

In some embodiments, the first signaling or the second signaling further includes a carrier indicator. In other embodiments, the carrier indicated by the carrier indicator is not active, or all BWPs in the carrier indicated by the carrier indicator are not active, or at least one BWP in the carrier indicated by the carrier indicator is in the dormant state, or the first type of BWP in the carrier indicated by the carrier indicator is active.

In some embodiments, the UE may ignore the information field other than reference signal resource set indication field.

In some embodiments, the UE may ignore the information field other than the reference signal resource set indication field and the carrier indication field.

In some embodiments, the UE may ignore the information field other than the reference signal resource set indication field, the carrier indication field, and the DCI format identifier field.

In some embodiments, the UE may ignore the information field other than the reference signal resource set indication field, the carrier indication field, the DCI format identifier field, and the BWP indication field.

In some embodiments, the first signaling, or the second signaling further includes a carrier indicator. Alternatively, the carrier indicated by the carrier indication field is not active, or all BWPs in the carrier indicated by the carrier indication field are not active, or at least one BWP in the carrier indicated by the carrier indication field is in the dormant state, or the first type of BWP in the carrier indicated by the carrier indication field is active.

In some embodiments, the reference signal resource set indicated by the reference resource set indication field is after the first or second signaling scheduled PDSCH by an gap X. (e.g., the PDSCH scheduled by the first or second signaling is MAC CE activation command). In an example, X is not less than 3 ms. In an example, X is a non-negative values.

In some embodiments, the first signaling or the second signaling scheduling information of MAC CE for scell activation and/or the request field.

In some embodiments, the request field includes a CSI request or an SRS request.

In some embodiments, the MAC CE and/or CSI request domain has one of the following characteristics:

The scell ID activated in the MAC CE is the same as the carrier ID in the CSI-ReportConfig associated with the trigger state in the request field.

The BWP ID in the CSI-ReportConfig associated with the trigger state in the CSI request field is 0 or indicates firstActiveDownlinkBWP-Id.

If the carrier ID configured in the CSI-ReportConfig associated with the trigger state in the CSI request field is same with the scell ID activated in the MAC CE, the CSI-ReportConfig is valid.

CSI-ReportConfig is valid if the BWP ID configured in the CSI-ReportConfig associated with the trigger state in the CSI request field is 0 or firstActiveDownlinkBWP-Id.

The carrier ID in the CSI-ReportConfig associated with the trigger state in the CSI request field is the scell ID activated in the MAC CE.

In some embodiments, the trigger state may be a aperiodic trigger state or a semi-persistent trigger state.

In some embodiments, the aperiodicTriggeringOffset in the CSI-RS resource set associated with the aperiodic trigger state is a gap between the timing that a MAC CE takes effect and a timing that CSI-RS resource set is transmitted In some embodiments, the aperiodic trigger state is associated with the aperiodicTriggeringOffset in the CSI-RS resource set, which is the gap between the timing that the MAC CE is sent to the timing CSI-RS resource set is transmitted. In some embodiments, the aperiodicTriggeringOffset in the CSI-RS resource set associated with the aperiodic trigger state is timing between the acknowledgement information of the MAC CE is sent to the timing the CSI-RS resource set is sent. Herein, the timing is in a granularity of a slot, a symbol, a subframe or a half-frame.

In some embodiments, the first symbol of the CSI-RS resource set is not less than 3 ms between the first signaling or the second signaling.

In some embodiments, the offset in the SRS resource set associated with the aperiodic trigger state is an gap between the timing that a MAC CE takes effect and a timing that a SRS resource set is transmitted. In some embodiments, the aperiodic trigger state is associated with the aperiodicTriggeringOffset in the SRS resource set, which is the gap between the timing that the MAC CE is sent to the timing that the SRS resource set is transmitted. In some embodiments, the aperiodicTriggeringOffset in the SRS resource set associated with the aperiodic trigger state is between the timing the acknowledgement information of the MAC CE is sent and the timing the SRS resource set is sent. Herein, the timing is in a granularity of a slot, a symbol, a subframe or a half-frame.

In some embodiments, the first symbol of the SRS resource set is not less than 3 ms between the first signaling or the second signaling.

In some embodiments, the first signaling, or the second signaling includes scheduling information of a scell activation MAC CE. The scell activation MAC CE containing R=0, which is a reserved bit. If scell activation MAC CE containing R=1, which represents triggering or activating the CSI-RS resource set.

In some embodiments, the time-domain behavior of the CSI-RS resource set may be aperiodic or semi-persistent.

In some embodiments, the aperiodic CSI-RS resource set may be configured by RRC signaling.

In some embodiments, the offset in the semi-persistent CSI-RS resource set is an offset from MAC CE. For example, the offset is offset from timing the MAC CE is transmitted or the MAC CE takes effect or the MAC CE acknowledgement is transmitted. Alternatively, the offset is adjusted according to the timing MAC CE is transmitted or the MAC CE takes effect or the MAC CE acknowledgement is transmitted.

In some embodiments, the first symbol of the CSI-RS resource set to the first signaling or the second signaling is no less than 3 ms.

In some embodiments, the first signaling or the second signaling includes scheduling information of a scell activation MAC CE. If scell activation MAC CE containing R=0, which is a reserved bit. If scell activation MAC CE containing R=1, which represents triggering or activating the SRS resource set.

In some embodiments, the time-domain behavior of the SRS resource set may be aperiodic or semi-persistent.

In some embodiments, the aperiodic SRS resource set may be configured by RRC signaling.

In some embodiments, the offset in the semi-persistent SRS resource set is an offset from MAC CE. For example, the offset is an offset from the MAC CE is transmitted or the MAC CE takes effect or the MAC CE acknowledgement is transmitted. Alternatively, the offset is adjusted according to the timing MAC CE is transmitted or the MAC CE takes effect or the MAC CE acknowledgement is transmitted.

In some embodiments, the first symbol of the SRS resource set to the first signaling or the second signaling is no less than 3 ms.

Examples of Interpretation of Bit Fields

In some embodiments, the bit field indication information in the first or second signaling is related to the other bit field indication information.

For example, the first bit field of the first or second signaling determines the information indicated by the second bit field of the first or second signaling. For example, if the first bit field is either the first code point or the wakeup, the second bit field indicates the period of the wakeup indication.

For another example, if the first bit field of the first or second signaling is either a second code point or non-awake information, the second bit field indicates the period of the non-wakeup indication.

The following table shows an example relationship between the first bit field indication information and the second bit field indication information

| First bit field value or code point | Second bit field value or code point | Second bit field indication information |
|---|---|---|
| C1-1 | C2-1 | The UE needs to wake up in N_1 DRX cycles; |
| ... | ... | ... |
| C1-1 | C2-n | The UE needs wake up in N_n DRX cycles; |
| C1-2 | C2-1 | The UE does not need to wake up in N_1 DRX cycles; |
| ... | ... | ... |
| C1-2 | C2-n | The UE does not need to wake up in N_n DRX cycles; |
| ... | ... | ... |

In the table above, C1-1, C1-2, C2-1, C2-2, N_1, and N_n are non-negative integers.

For yet another example, the first bit field of the first or second signaling is either the first code point or the wake-up information, the information indicated by the second bit field of the first or second signaling includes at least one of the following: offset of time-domain resource allocation information, bandwidth part indicator information, maximum MIMO layer information or PDCCH monitoring information or RS resource set information.

For yet another example, if the first bit field of the first or second signaling is either a second code point or non-awake information, the second bit field indication information of the first or second signaling indicates that the drx-onDurationTimer does not need to be started/restarted in the N DRX cycles, or the UE does not need to monitor the first type of DCI set during the drx-onDurationTimer timing in the N DRX cycles; or the UE does not need to monitor PDCCH in the N DRX cycles; or, the UE does not need to monitor the first type of DCI set in N DRX cycles.

In this example, N is a non-negative integer. In some embodiments, N is related to the value of the second bit field.

Examples of Signaling in Cells and/or Cell Groups

In some embodiments, the first or second signaling is sent in a first cell or a cell group. Alternatively, the UE monitors the PDCCH carrying the first or second signaling only in the first cell or cell group. The first cell or the set of cells may include one of the following: a primary cell, a special cell (Spcell, special cell), a PScell, or a cell configured by a high layer signaling.

In some embodiments, the PDCCH carrying the first or second signaling is transmitted/monitored only in certain specific cells or cell sets, which can advantageously save resource overhead and also provide power saving gains.

In some embodiments, the number of DCI lengths or information field bits carried by the first or second signaling depends on at least one of the following factors:
Parameter configuration of the first cell or cell set; or
number of configured cells or cell sets; or,
number of active cells or cell sets; or,
The number of predefined bits for all or part of the information field.

In some embodiments, the number of DCI lengths or information field bits carried by the first or second signaling depends on the parameter configuration of the first cell or the set of cells, or the number of entries, or the maximum or maximum index in the parameter configuration set. For example, the number of bandwidth parts, the number of entries in the minimum time domain resource offset set or the maximum or minimum time domain resource offset set or maximum index, the number of entries in the maximum MIMO layer set or the maximum MIMO layer or maximum index, the number of entries in the PDCCH monitoring information set or the maximum value of the PDCCH monitoring information set or maximum index.

In some embodiments, the number of DCI lengths or information field bits carried by the first or second signaling depends on the number of configured cells or cell sets.

In some embodiments, the number of DCI lengths or information field bits carried by the first or second signaling depends on the number of activated cells or cell sets.

In some embodiments, the number of DCI lengths or information field bits carried by the first or second signaling depends on the predefined number of bits of all or part of the information field. For example, the bit length of all or part of the information fields in the DCI is predefined.

In some embodiments, for a cell or a set of cells, the relevant information can be obtained by one of the following:
Method-1: Configure the serving cell ID, the location information in the DCI, and the mapping rule; or
Method-2: Configuring or pre-defining the information of the serving cell and the DCI code point mapping rule; or
Method-3: Modifying the relevant information field according to the configuration parameters of the cell or the cell set; or
Method-4: deriving the indicated information of a cell or a set of cells according to the first or second signaling value.

In some embodiments, the second cell or set of cells may be the same cell or a set of cells as the first cell or the set of cells, or a set of cells or cells having the same identification (ID).

In an example for Method-1, the configuration information of the UE includes: a serving cell or a cell set ID, location information in the DCI, and a mapping rule. The location information includes at least one of: an information block index, a bit index, a block start position, a start bit position, a block end position, a end bit position, a block size, or a number of bits. The UE may be configured with multiple cell or cell set IDs, corresponding location information, and mapping rules, so that the UE acquires corresponding configuration information of multiple cells or cell sets.

In an example for Method-2, the information of each cell or cell set is jointly coded. The joint coding method includes that the same type of information of different cells or cell sets is jointly coded; or different types of information of different cells or cell sets are jointly coded. The same type of information of the different cells or cell sets is jointly coded. The same type of information of different cells or cell sets is represented by the same information field. The different types of information of the different cells or cell sets are jointly coded. The different types of information of different cells or cell sets are represented by the same information field.

In an example for Method-3, the first or second signaling is sent in a first cell or a cell group. For the second cell or the cell set, the interpretation of information or information field carried is one of the following:

Mod(cell_indicator_1, Max_indicator_2); or,
Min(cell_indicator_1, Max_indicator_2); or,
Mod(cell_value_1, Max_value_2); or,
Min(cell_value_1, Max_value_2); or,
Operator-1 (cell_value_1, cell_value_set_2); or,
Operator-2 (cell_value_1, cell_value_set_2); or, In an example, if the number of bits of the second cell or the cell set related information field is greater than the number of indicators indicator_size_1 that characterizes the first cell or the cell set related information field, indicator_size_2-indicator_size_1 of zeros are padded before or after the information field for the interpretation.

In another example, if the number of bits indicator_size_2 characterizing the second cell or the cell set related information field is smaller than the number of bits indicator_size_1 characterizing the first cell or the cell set related information field, indicator_size_1-indicator_size_2 bits of the most/least significant bits are truncated for the interpretation.

In the above examples, the cell_indicator_1 is the value/code point of the information field, the Max_indicator_2 is the number of resources associated with the information field configured by the second cell or the cell set, the cell_value_1 is the resource information indicated by the information field, and the Max_value_2 is a maximum value of the resource associated with the information field configured with the second cell or the cell set; cell_value_set_2 is a set of resource values associated with the information field configured for the second cell or the set of cells; operator-1 (cell_value_1, cell_value_set_2) indicates a minimum value of the cell_value_set_2 that is not less than the value of cell_value_1; operator-2 (cell_value_1, cell_value_set_2) indicates that the largest value of set cell_value_set_2 is not greater than cell_value_1. Among them, the values in cell_value_set_2 are arranged from small to large, or from large to small.

In another example for Method-3, the first or second signaling is sent in a first cell or a cell group. For the second cell or the cell set, the interpretation of information or information field carried is one of the following:
Mod(cell_indicator_s, Max_indicator_2); or,
Min(cell_indicator_s, Max_indicator_2); or,
Mod(cell_value_s, Max_value_2); or,
Min(cell_value_s, Max_value_2); or,
Operator-1 (cell_value_s, cell_value_set_2); or,
Operator-2 (cell_value_s, cell_value_set_2); or, In an example, if the number of bits indicator_size_2 of the second cell or cell set related information field is greater than the number of bits of the first or second signaling related information field indicator_size_s, (indicator_size_2-indicator_size_s) of zeros are padded before or after the information field for the interpretation.

In another example, if the number of bits indicator_size_2 characterizing the second cell or the cell set related information field is smaller than the bit number indicator_size_s of the first or second signaling related information field, indicator_size_s-indicator_size_2 bits of the most/least significant bits are truncated for the interpretation.

In the above examples, cell_indicator_s is the value/code point of the first or second signaling information field, and Max_value_2 is a maximum value of the resource associated with the information field configured with the second cell or the cell set; and cell_indicator_s is the first or second signaling information field indication. Resource information, Max_value_2 is a maximum value of resources related to the information field configured by the second cell or the cell set; cell_value_set_2 is a set of resource values related to the information domain configured for the second cell or the cell set; operator-1 (cell_value_s), cell_value_set_2) indicates that minimum value of the set cell_value_set_2 is not less than cell_value_s; operator-2 (cell_value_s, cell_value_set_2) indicates that the largest value of set cell_value_set_2 is not greater than cell_value_s.

In some embodiments, the second cell or set of cells may be the same cell or a set of cells as the first cell or the set of cells, or a set of cells or cells having the same identification mark (ID).

In an example for method-4, the cell or the cell set directly derives the corresponding parameter configuration according to the information indicated by the first or second signaling information field.

Examples of Additional Field Position

In some embodiments, additional bit fields may be added based on predefined conditions that are related to at least one of the following factors: DCI format, location of some information fields in the DCI, search space.

The first predefined condition is that the DCI format of the indication information is DCI format 0_0, or the number of bits after the UL/SUL information field in the DCI is a fixed length (including 0), or the information field bit length after the UL/SUL information field is related to only UE specific or cell specific or carrier specific parameter/configuration.

The second predefined condition is that the DCI format of the indication information is DCI format 0_1, or the number of bits before the carrier indicator information field or the UL/SUL information field or the bandwidth part indicator information field in the DCI is a fixed length (including 0). Or, the information field bit length before the carrier indicator information field or the UL/SUL information field or the bandwidth part indicator information field in the DCI in the DCI is related to only UE specific or cell specific or carrier specific parameter/configuration.

The third predefined condition is that the DCI format of the indication information is DCI format 1_1, or the number of bits before the carrier indicator information field or the bandwidth part indicator information field in the DCI is a fixed length (including 0), or the DCI The information field bit length before the carrier indicator information field or the bandwidth part indicator information field in the DCI is related to only UE specific or cell specific or carrier specific parameter/configuration.

In some embodiments, the bit field carrying the indication information may be at least one of the following information fields are predefined code points or a part of bits of at least one of the following information fields:
Frequency domain resource assignment field;
Retransmission process number (HARQ process number) field;
Carrier indicator field;
Bandwidth part indication (BWP indicator) field;
A second transport block (transport block 2) field;
Downlink assignment index field;
Modulation and coding scheme field;
Precoding information and number of layers;
Antenna port field;

Example 1. In some embodiments, for the first type of information, the bit field of the indication information includes part or all of the code points or part or all bits in the bandwidth part indication field.

For example, the first code point set in the bandwidth part indication field indicates a bandwidth part, and the second code point set in the bandwidth part indication field represents the first type of information.

For another example, the first bit set in the bandwidth part indication field indicates a bandwidth part, and the second bit set in the bandwidth part indication field represents the first type of information. The first set of bits is a high-order bit or a status bit in the bandwidth part indication field.

For yet another example, if the UE does not support switching the BWP through the DCI, the indication of the first type of information includes a bandwidth part indication field.

In some embodiments, the first type of information has at least one of the following characteristics:

One or more may be configured by higher layer signaling (RRC signaling or MAC CE); or, The configuration of the first type of information is BWP specific (per BWP).

In some embodiments, the first type of information includes at least one of a minimum time-domain resource offset or a maximum MIMO layer.

In this example, if the UE does not support switching the BWP through the DCI, or the number of configured BWPs is limited, the first type of information can be indicated by the bandwidth part indication field.

Example 2. In some embodiments, for the second type of information, the bit field of the indication information includes some or all code points or partial bits or all bits in the downlink allocation index domain.

For an example, the first code point set in the downlink allocation index field indicates a downlink allocation index, and the second code point set in the bandwidth part indication field indicates the second type information.

For another example, the first bit set in the downlink allocation index field indicates a downlink allocation index, and the second bit set in the downlink allocation index field indicates second type information. The first set of bits is the most/least significant bits in the bandwidth part indication field.

For yet another example, if the first condition is met, the indication of the first type of information includes a downlink allocation index field; otherwise, the downlink allocation index field indicates a downlink allocation index.

In some embodiments, the downlink allocation index field includes at least one of the following: a first downlink allocation index field, a second downlink allocation index field, or a downlink allocation index field.

For an example, for the first downlink allocation index field, the first condition is to adopt a dynamic HARQ-ACK codebook. If the dynamic HARQ-ACK codebook is used, the first downlink allocation index field indicates a codebook; otherwise, the first downlink allocation index field includes at least one bit or one code point indicating the second type of information.

In some embodiments, for the second downlink allocation index field, the first condition is a dynamic HARQ-ACK codebook based on two sub-HARQ-ACK codebooks (sub-code books). If the dynamic HARQ-ACK codebook is based on two sub-HARQ-ACK codes, the first downlink allocation index field indicates a codebook; otherwise, the first downlink allocation index field includes at least one bit or one code point indicating the second type of information (eg, two bits, or four code points);

In some embodiments, for the downlink allocation index field, the first condition is that the number of serving cells in the downlink configuration is greater than 1, and is a dynamic HARQ-ACK codebook. If the number of serving cells configured for the downlink is greater than 1, and is a dynamic HARQ-ACK codebook, the downlink allocation index field indicates a codebook; otherwise, the downlink allocation index field includes at least one bit or one code point indicating the second two type of information; (for example, two bits, a high bit of 2 bits, or four code points).

In some embodiments, the second type of information includes at least one of the following:
Wake-up indicator;
Offset of time domain resource allocation;
Bandwidth part indicator;
Maximum MIMO layer indication;
PDCCH monitoring indication; or,
Reference signal resource set indication.

In some embodiments, UE can ignore all or some of fields that do not contain the second type of information.

In some embodiments, all or some of fields that do not contain the second type of information are zeros or ones.

Examples of Multi-Beam Operation

In some embodiments, the monitoring occasion of the second signaling does not include a DRX Active Time, during which the beam management mechanism fails to work, and the first and/or second transmitting nodes (UE and/or base station, UE and/or TRP) may lose the beam pair information. In order to improve the reliability of the second signaling, in a multi-beam operation, the base station can repeatedly transmit the same information content with multi-beams. The UE can soft combine the energy of multiple beams to improve decoding performance. On the other hand, considering the encoding method of the second signaling (for example, a Polar code encoding), the first signaling that is repeatedly transmitted should be the same bit length after the operation of encoding/rate matching or the first signaling that is repeatedly transmitted. Alternatively, the same aggregation level may be used or the same resource element (RE) number occupied.

For an example, in the case of multiple beams, the signaling transmitted in the multiple beams should contain the same information and use the same aggregation level or occupy the same RE number or the same bit after encoding/rate matching.

For another example, in the case of multiple beams, the signaling transmitted in the multiple beams should contain same information, and the number of aggregation levels is not less than 8.

For another example, in the case of multiple monitoring occasions, the UE expects to receive the signaling of different monitoring occasions with same information and the same aggregation level or occupy the same RE number or coded bits.

For another example, in the case of multiple monitoring occasions, the UE expects to receive the signaling of different monitoring occasions with same information, and the number of aggregation levels is not less than 8.

For another example, in the case of multiple monitoring occasions, the UE expects to receive the DCI of different monitoring occasions with same information and the same aggregation level or occupy the same RE number or coded bits.

For another example, in the case of multiple monitoring occasions, the UE expects to receive the DCI of different monitoring occasions with same information, and the number of aggregation levels is not less than 8.

Example 1. In some embodiments, the DCI carrying the second signaling includes a wakeup indication. The configuration information of the UE includes a serving cell ID, and the wakeup indicates location information in the DCI. If the UE is configured with multi-carrier operation (CA, DC, SUL, or SDL), the wake-up indication of different carriers are bitmapped into the DCI.

Figure 3:
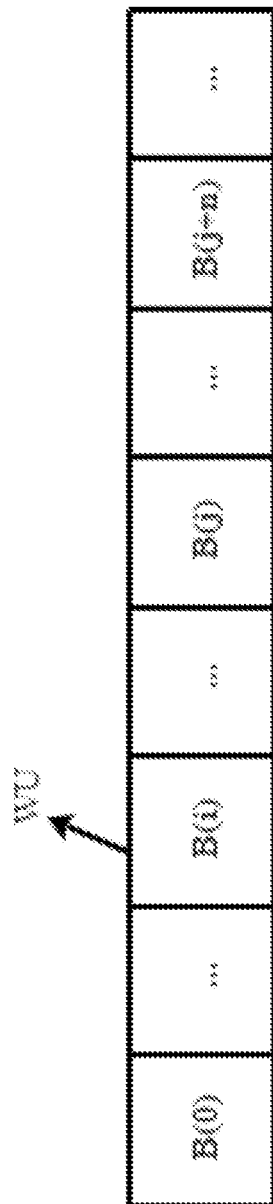
FIG. 3 shows another example of DCI comprising a wake-up indication.

As shown in FIG. 3, the UE configures serving cells cell-i and cell-j.

For the serving cell cell-i, the configuration information of the UE includes Cell ID cell-i-ID. In an example, the configuration information of the UE includes location information of the wake-up of cell-i in the DCI.

In some embodiments, the UE monitors the DCI carrying the second signaling in a specific cell. The specific cell may be a Pcell, a PScell, a Spcell, or a cell configured with search space of second signaling.

In some embodiments, the location information may be a bit location or a bit block location.

In some embodiments, the location information includes at least one of a starting bit position, an end bit position, a bit length, a starting position of a block, a bit block index, or an end position of a block.

In an example, as shown in Table 1, Bi is a state 1 (for example, 1) indicating "waking up". If Bi is a state 2 (for example, 0), the indication is to not wake up.

TABLE 1

| Bi | Wake up indication |
|---|---|
| State 1 | Wake |
| State 2 | Not wake up |

For example, as in Table 2, Bi is a bit block. Herein, one bit of Bi (eg, Bi-0) is a wake-up indication, and other bits (eg, Bi-others) indicate a time period that the wake-up indication is valid or indicated. When Bi-0 indicates "wake-up", Bi-others indicates the time period that the corresponding wake-up is valid or indicated. when Bi-0 indicates "do not wake-up", the Bi-others indication indicates time period that the corresponding non-wake-up is valid or indicated,

TABLE 2

| Bi-0 | Bi-others | Instructions |
|---|---|---|
| Status 1 | Bi-1 | The UE needs to wake up in N_1 DRX cycles; |
| ... | ... | ... |
| Status 1 | Bi-n | The UE needs to wake up in N_n DRX cycles; |
| Status 2 | Bi-1 | The UE does not need to wake up in N_1 DRX cycles; |
| ... | ... | ... |
| Status 2 | Bi-n | The UE does not need to wake up in N_n DRX cycles; |

Example 2. In some embodiments, the DCI carrying the second signaling includes a wakeup indication.

In some embodiments, the configuration information of the UE includes location information of waking up indication in the DCI.

In some embodiments, the wakeup indication applies to all serving cells or activated serving cells.

Figure 2:
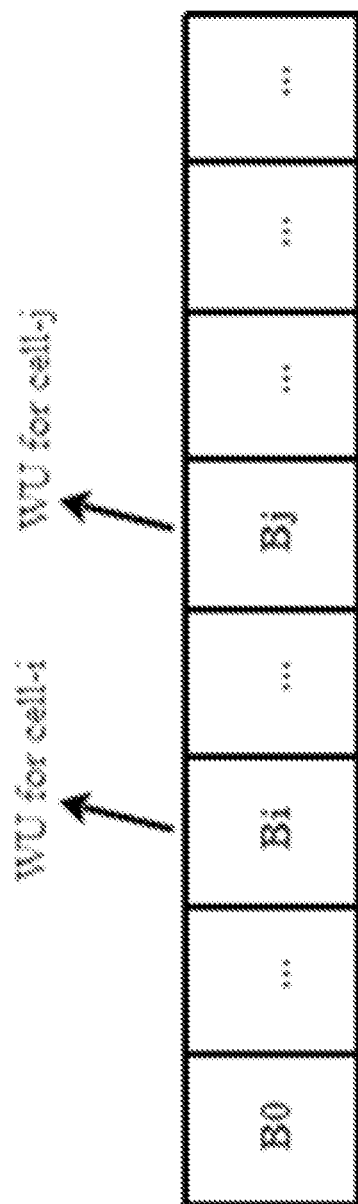
FIG. 2 shows an example of downlink control information (DCI) comprising wake-up indications for multiple cells.

As shown in FIG. 2, the configuration information of the UE includes location information of waking up indication in the DCI.

In some embodiments, the location information may be a bit location or a bit block location.

In some embodiments, the location information includes at least one of a starting bit position, a end bit position, a bit length, a starting position of block, a bit block index, or an end position of block.

For example, in Table 3, if Bi is state 1 (for example, 1), it indicates "wake up"; if Bi is state 2 (for example, 0), it indicates "do not wake up".

TABLE 3

| Bi | Wake up indication |
|---|---|
| Status 1 | Wake |
| Status 2 | Not wake up |

For example, in Table 4, Bi is a bit block. Herein one bit of Bi (e.g., Bi-0) is a wake-up indication, and other bits (e.g., Bi-others) indicate a time period that the wake-up indication is valid or indicated. When Bi-0 indicates "wake-up", Bi-others indicates the time period that the corresponding wake-up is valid or indicate. when Bi-0 indicates "no wake-up", the Bi-others indication indicates time period that the corresponding non-wake-up is valid or indicated,

TABLE 4

| Bi-0 | Bi-others | Instructions |
|---|---|---|
| Status 1 | Bi-1 | The UE needs to wake up in N_1 DRX cycles; |
| ... | ... | ... |
| Status 1 | Bi-n | The UE needs to wake up in N_n DRX cycles; |
| Status 2 | Bi-1 | The UE does not need to wake up in N_1 DRX cycles; |
| ... | ... | ... |
| Status 2 | Bi-n | UE does not need to wake up in N_n DRX cycles; |

Example 3. In some embodiments, the DCI carrying the second signaling includes a wake-up indication and/or a bandwidth part domain.

In some embodiments, some of the bandwidth domain indication information includes a BWP indicator and/or a bandwidth part state indication.

In some embodiments, the configuration information of the UE includes location information in the DCI.

In some embodiments, the UE monitors the DCI carrying the second signaling in a specific cell. The specific cell may be Pcell, PScell, or Spcell.

In some embodiments, the DCI carrying the second signaling includes a wake-up indication field $W(0) \sim W(i+n-1)$, and a bandwidth part domain $B(0) \sim B(i+n-1)$, where i, n are non-negative integers.

In some embodiments, and as shown in the example of FIG. 3, the UE configuration information includes wakeup indication W(i) location information in the DCI, and/or bandwidth part domain B(i) information in the DCI.

In some embodiments, the wakeup indication is applicable to all serving cells of the UE, or the activated serving cell.

For example, as shown in Table 5, if W(i) is state 1 (eg, 1), then "awake" is indicated, whereas if W(i) is state 2 (eg, 0), then "do not wake up" is indicated.

In some embodiments, if W(i) indicates "no wake-up", the UE may ignore the corresponding bandwidth part domain.

In some embodiments, if W(i) indicates "no wake-up", the corresponding bandwidth part domain is all 0s or all ones.

TABLE 5

| W(i) | Wake up indication |
|---|---|
| Status 1 | Wake |
| Status 2 | Not wake up |

In some embodiments, B(i) characterizes a bandwidth part state.

For example, as shown in Table 6, B(i) is state 1 (for example, 1) indicating an "active state", whereas if B(i) is state 2 (for example, 0), it represents the dormant state.

In some embodiments, if the bandwidth part field indication information includes switching to the "dormant state" or switching to the dormant BWP, the indication information is not applied to the Pcell, or the PScell, or the Spcell, or the Scell configured with the PUCCH.

TABLE 6

| B(i) | Instructions |
|---|---|
| Status 1 | Active state |
| Status 2 | Dormant state |

In some embodiments, B(i) characterizes a bandwidth part indication. In some embodiments, the wakeup indication is applicable to all serving cells of the UE, or the activated serving cell.

In some embodiments, for the serving cell cell-i, the DCI indication information is related to a parameter configuration of the cell-i. For example, the parameter configuration includes a number of BWPs, and/or the maximum ID of BWP-ID.

In some embodiments, for the serving cell cell-i, the BWP index indicated by the BWP domain is one of the following:

(1) mod(cell_indicator_1, Max_indicator_2); or,
(2) min(cell_indicator_1, Max_indicator_2); or,
(3) mod(cell_value_1, Max_value_2); or,
(4) min(cell_value_1, Max_value_2); or,
(5) operator-1 (cell_value_1, cell_value_set_2); or,
(6) operator-2 (cell_value_1, cell_value_set_2); or, In an example, if the BWP field bit number indicator_size_2 characterizing cell-i is greater than the number of bits indicator_size_1 characterizing the BWR field of the specific cell, indicator_size_2-indicator_size_1 of zeros are padded before or after the information field for the interpretation.

In another example, if the BWP field bit number indicator_size_2 characterizing cell-i is smaller than the bit number indicator_size_1 characterizing the BWP field, indicator_size_1-indicator_size_2 bits of the most/least significant bits are truncated for the interpretation In these examples, cell_indicator_1 is the value of B(i), Max_indicator_2 is the number of BWPs configured for cell-i, cell_value_1 is the BWP-ID of the specific cell indicated by B(i), Max_value_2 is the BWP maximum ID configured by cell-i, and cell_value_set_2 is BWP-ID set configured by cell-i; operator-1 (cell_value_1, cell_value_set_2) indicates that the minimum value of set cell_value_set_2 that is not smaller than cell_value_1; operator-2 (cell_value_1, cell_value_set_2) indicates that the largest value of set cell_value_set_2 that is not greater than cell_value_1. For example, cell_value_set_2 is arranged in order from smallest to largest or from largest to smallest.

In some embodiments, the UE does not expect the indication information in the DCI to invalid in any serving cell or activated serving cell configuration/parameter.

Example 4. In some embodiments, the DCI carrying the second signaling includes a wake-up indication, and/or a bandwidth part indication.

In some embodiments, some of the bandwidth domain indication information includes a BWP indicator, and/or a bandwidth part state indication.

In some embodiments, the configuration information of the UE includes location information in the DCI.

In some embodiments, the UE monitors the DCI carrying the second signaling in a specific cell. The specific cell may be Pcell, PScell, or Spcell.

In some embodiments, the UE configuration information includes waking location information indicating in the DCI, and/or information of a bandwidth part field in the DCI. As shown in FIG. 4, the wake-up indication, and/or bandwidth part indication is indicated by B(i).

In some embodiments, the relationship between the value of B(i) and the information indicated is as shown in Table 7, wherein State 1 can be all 0s, or all 1s. The BWP indication information (1)~BWP indication information (n−1) may be configured by higher layer signaling. Alternatively, the BWP indication information characterizes the BWP ID, where BWP ID=B(i), or BWP ID=B(i)−1.

TABLE 7

| B(i) | Instructions |
|---|---|
| Status 1 | Not wake up |
| Status 2 | BWP Instructions (1) |
| ... | ... |
| Status n | BWPInstructions (n − 1) |

In some embodiments, for the serving cell cell-i, the DCI indication information is related to a parameter configuration of the cell-i. For example, the parameter configuration includes a number of BWPs, and/or a maximum ID of BWP ID.

For the serving cell cell-i, the BWP index indicated by the BWP domain is one of the following:

(1) mod(cell_indicator_1, Max_indicator_2); or,
(2) min(cell_indicator_1, Max_indicator_2); or,
(3) mod(cell_value_1, Max_value_2); or,
(4) min(cell_value_1, Max_value_2); or,
(5) operator-1 (cell_value_1, cell_value_set_2); or,
(6) operator-2 (cell_value_1, cell_value_set_2); or, In an example, if the BWP field bit number indicator_size_2 characterizing cell-i is greater than the number of bits indicator_size_1 characterizing the BWR field of the specific cell, the indicator_size_2-indicator_size_1 of zeros are padded before or after the information field for the interpretation; or In another example, if the BWP field bit number indicator_size_2 characterizing cell-i is smaller than the bit number indicator_size_1 characterizing the BWP field, indicator_size_1-indicator_size_2 bits of the most/least significant bits are truncated for the interpretation In these examples, cell_indicator_1 is B(i)+delta, Max_indicator_2 is the number of BWPs configured for cell-i; cell_value_1 is the BWP-ID of the specific cell indicated by B(i), Max_value_2 is the BWP maximum ID of cell-i configuration; cell_value_set_2 is the BWP-ID set configured by cell-i; operator-1 (cell_value_1, cell_value_set_2) indicates that the minimum value of set cell_value_set_2 is not less than cell_value_1; operator-2 (cell_value_1, cell_value_set_2) indicates that the largest value of set cell_value_set_2 is not greater than cell_value_1. where delta is an integer. For example, the value of delta can be {±2, ±1,0}. For example, cell_value_set_2 is arranged in order from smallest to largest or from largest to smallest.

In some embodiments, the UE does not expect the indication information in the DCI to be invalid in any serving cell or activated serving cell configuration parameter.

Example 5. In some embodiments, the DCI carrying the second signaling includes a wake-up indication, and/or a bandwidth part indication. Some of the bandwidth domain indication information includes a BWP indicator, and/or a bandwidth part state indication. The configuration information of the UE includes location information in the DCI.

In some embodiments, the UE monitors the DCI carrying the second signaling in a specific cell. The specific cell may be Pcell, PScell, or Spcell.

In some embodiments, the UE configuration information includes location of waking information indicated in the DCI, and/or information of a bandwidth part field in the DCI.

In some embodiments, the wake-up indication of the different serving cells or the activated serving cell are joint coded. The joint code manner may be the same bit or the bit field indicating multiple serving cells or active serving cell.

In some embodiments, the bandwidth part indication information of different serving cells or activated serving cells are joint coded.

In some embodiments, the wake-up indication and the bandwidth part indication of different serving cells or activated serving cells are joint coded.

Example 6. In some embodiments, the DCI carrying the second signaling includes a wake-up indication, and/or a bandwidth part indication. Some of the bandwidth domain indication information includes a BWP indicator, and/or a bandwidth part state indication. The configuration information of the UE includes the cell ID and the location of the corresponding information in the DCI.

In this way, during multi-carrier operation, multiple cell IDs and locations of corresponding information in the DCI can be configured, so that indication information of different cells can be acquired.

In some embodiments, the UE monitors the DCI carrying the second signaling in a specific cell. The specific cell may be Pcell, PScell, or Spcell.

In some embodiments, the UE configuration information includes waking location information indicating in the DCI, and/or information of a part of the bandwidth domain in the DCI.

In some embodiments, the information representation manner of the UE in the DCI is shown in FIG. 5. The indications of W(i) and B(i) are shown in Tables 5 and 6.

Figure 6:
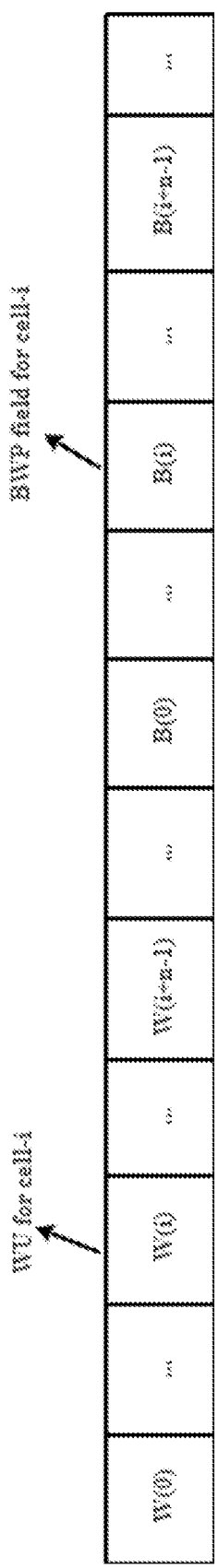
FIG. 6 shows yet another example of DCI comprising a wake-up indication and a bandwidth part (BWP) field for a particular cell.
Figure 7:
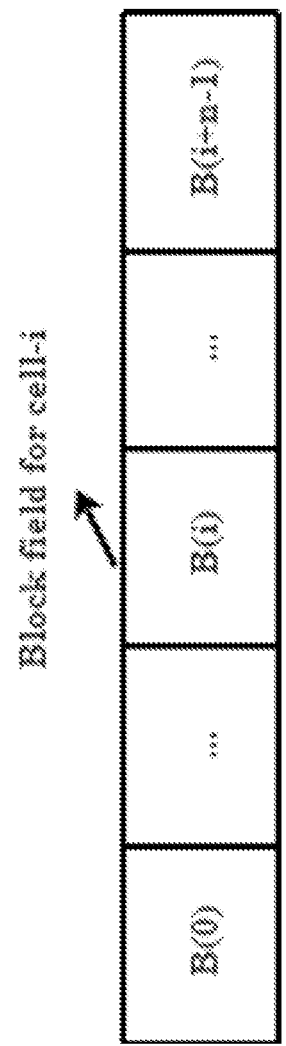
FIG. 7 shows yet another example of DCI comprising a block field for a particular cell.

In some embodiments, the information of the UE in the DCI is shown in FIG. 6. The indication information of B(i) is shown in Table 7.

Example 7. In some embodiments, the DCI carrying the second signaling includes a wake-up indication, and/or a second type of information. The configuration information of the UE includes location information in the DCI.

In some embodiments, the UE monitors the DCI carrying the second signaling in a specific cell. The specific cell may be Pcell, PScell, or Spcell.

In some embodiments, the UE configuration information includes: location of waking information indicated in the DCI, and/or second type information location information. Take FIG. 3 as an example, where W(0)~W(i+n−1) is the wake-up indication field; B(0)~B(i+n−1) indicates the second type of information, and i and n are non-negative integers.

In some embodiments, the wakeup indication is applicable to all serving cells of the UE, or the active serving cell.

In some embodiments, as shown in Table 5, if W(i) is state 1 (e.g., 1), then "wakeup" is characterized; if W(i) is state 2 (e.g., 0), then the representation does not wake up.

In some embodiments, if W(i) indicates "no wake-up", the UE may ignore the corresponding second type of information.

In some embodiments, if W(i) indicates "no wake-up", the corresponding bandwidth part domain is all 0s or all ones.

In some embodiments, B(i) characterizes the second type of information. Optionally, the second type of information is applicable to all serving cells of the UE, or the active serving cell.

In some embodiments, for the serving cell cell-i, the DCI indication information is related to a parameter configuration of the cell-i. For example, the parameter configuration includes a second type of information, and/or a second type of information maximum index, and/or a maximum value of the second type of information.

For the serving cell cell-i, the second type of information indicated is one of the following:
 (1) mod(cell_indicator_1, Max_indicator_2); or,
 (2) min(cell_indicator_1, Max_indicator_2); or,
 (3) mod(cell_value_1, Max_value_2); or,
 (4) min(cell_value_1, Max_value_2); or,
 (5) operator-1 (cell_value_1, cell_value_set_2); or,
 (6) operator-2 (cell_value_1, cell_value_set_2); or, In an example, if the second information bit number indicator_size_2 characterizing the cell-i is greater than the number of bits indicator_size_1 characterizing the second type information of the specific cell, the indicator_size_2-indicator_size_1 of zeros are padded before or after the information field for the interpretation.

In another example, if the second information bit number indicator_size_2 characterizing cell-i is smaller than the bit number indicator_size_1 of the second type of information of the specific cell, indicator_size_1-indicator_size_2 bits of the most/least significant bits are truncated for the interpretation In these examples, the cell_indicator_1 is B(i)+delta, and the Max_indicator_2 is the second type of information configured by the cell-i; the cell_value_1 is the second type of information of the specific cell indicated by B(i), and the Max_value_2 is the maximum value of the second type of information configured for the cell-i. The maximum value of the class information; cell_value_set_2 is the second type of information set configured by cell-i; operator-1 (cell_value_1, cell_value_set_2) indicates that the minimum value of set cell_value_set_2 that is not less than cell_value_1; operator-2 (cell_value_1, cell_value_set_2) represents the largest value of set cell_value_set_2, that is not greater than cell_value_1. Herein, delta is an integer. For example, the value of delta can be {±2, ±1,0}.

In some embodiments, the UE does not expect the indication information in the DCI to invalid in any serving cell or activated serving cell configuration parameter.

In some embodiments, the second type of information may be a combination of one or more of:
 Offset of time domain resource allocation information;
 Part of the bandwidth part indicator information;
 Maximum MIMO layer information;
 PDCCH monitoring information; or.
 Reference signal resource set indication.

In some embodiments, the second type of information may be an offset of time-domain resource allocation information, a bandwidth part indicator information, a maximum MIMO layer indication, PDCCH monitoring information, or reference signal resource set indication information.

In some embodiments, the second type of information may be bandwidth part indicator information and maximum MIMO layer information. Herein, the bandwidth part and the maximum MIMO layer may have independent bit fields in B(i); or, the bandwidth part and the maximum MIMO layer are jointly encoded in B(i); or the wake-up indication, bandwidth part, and maximum MIMO layer are jointly encoded in B(i).

In some embodiments, the second type of information may be bandwidth part indicator information, and PDCCH monitoring information. Herein, part of the bandwidth and PDCCH monitoring information may have independent bit fields in B(i); or part of the bandwidth and PDCCH monitoring information are jointly encoded in B(i); or, wake-up indication, part Bandwidth, PDCCH monitoring information is jointly encoded in B(i).

In some embodiments, the second type of information may be bandwidth part indicator information, and a reference signal resource set indication. Herein, part of the bandwidth and reference signal resource set indication may have an independent bit field in B(i); or part of the bandwidth and reference signal resource set indicates joint coding in B(i); or, wake-up indication, bandwidth part, Joint coding in PDCCH monitoring information.

Example 8. In some embodiments, the DCI carrying the second signaling includes a wakeup indication, and/or a second type of information indication. The configuration information of the UE includes location information in the DCI.

In some embodiments, the UE monitors the DCI carrying the second signaling in a specific cell. The specific cell may be Pcell, PScell, or Spcell.

In some embodiments, the UE configuration information includes waking location information indicating the DCI, and/or information of the second type information domain in the DCI. As shown in FIG. 4, the wake-up indication, and/or the second type of information is indicated by B(i). The relationship between the value of B(i) and the information indicated is as shown in Table 8. State 1 can be all 0s, or all 1s.

In some embodiments, the second type of information (1) to the second type of information (n−1) can be configured by higher layer signaling.

TABLE 8

| B(i) | Instructions |
|---|---|
| Status 1 | Not wake up |
| Status 2 | Second type of information (1) |
| ... | |
| Status n | Second type of information (n − 1) |

In some embodiments, for the serving cell cell-i, the DCI indication information is related to a parameter configuration of the cell-i. For example, the parameter configuration includes a second type of information, and/or a second type of information maximum index, and/or a first type of information maximum.

For the serving cell cell-i, the second type of information is one of the following:
 (1) mod(cell_indicator_1, Max_indicator_2); or,
 (2) min(cell_indicator_1, Max_indicator_2); or,
 (3) mod(cell_value_1, Max_value_2); or,
 (4) min(cell_value_1, Max_value_2); or,
 (5) operator-1 (cell_value_1, cell_value_set_2); or,
 (6) operator-2 (cell_value_1, cell_value_set_2); or, In an example, if the second information bit number indicator_size_2 characterizing the cell-i is greater than the number of bits indicator_size_1 characterizing the second type information of the specific cell, the indicator_size_2-indicator_size_1 of zeros are padded before or after the information field for the interpretation.

In another example, if the second information bit number indicator_size_2 characterizing cell-i is smaller than the bit number indicator_size_1 characterizing the second type information of the specific cell, indicator_size_1-indicator_size_2 bits of the most/least significant bits are truncated for the interpretation In these examples, the cell_indicator_1 is B(i)+delta, and the Max_indicator_2 is the second type of information configured by the cell-i; the cell_value_1 is the second type of information of the specific cell indicated by B(i), and the Max_value_2 is maximum value of the second type of information the cell-i configured. cell_value_set_2 is the second type of information set configured by cell-i; operator-1 (cell_value_1, cell_value_set_2) indicates that the minimum value of set cell_value_set_2 that is not less than cell_value_1; operator-2 (cell_value_1, cell_value_set_2) represents the largest value of set cell_value_set_2 that is not greater than cell_value_1. Herein, delta is an integer. For example, the value of delta can be {±2, ±1,0}.

In some embodiments, the UE does not expect the indication information in the DCI to be invalid in any serving cell or activated serving cell configuration parameter.

In some embodiments, the second type of information may be a combination of one or more of an offset of time-domain resource allocation information, a bandwidth part indicator information, maximum MIMO layer information, PDCCH monitoring information or a reference signal resource set indication.

In some embodiments, the second type of information may be an offset of time-domain resource allocation information, bandwidth part indicator information, a maximum MIMO layer indication, PDCCH monitoring information, or reference signal resource set indication information.

In some embodiments, the second type of information may be bandwidth part indicator information and maximum MIMO layer information. Herein, the bandwidth part and the maximum MIMO layer may have independent bit fields in B(i); or, the bandwidth part and the maximum MIMO layer are jointly encoded in B(i); or The wake-up indication, bandwidth part, and maximum MIMO layer are jointly encoded in B(i).

In some embodiments, the second type of information may be bandwidth part indicator information, and PDCCH monitoring information. Herein, part of the bandwidth and PDCCH monitoring information may have independent bit fields in B(i); or part of the bandwidth and PDCCH monitoring information are jointly encoded in B(i); or, wake-up indication, part Bandwidth, PDCCH monitoring information is jointly encoded in B(i).

In some embodiments, the second type of information may be bandwidth part indicator information, and a reference signal resource set indication. Herein, part of the bandwidth and reference signal resource set indication may have an independent bit field in B(i); or part of the bandwidth and reference signal resource set indicates joint coding in B(i); or, wake-up indication, bandwidth part, Joint coding in PDCCH monitoring information.

Example 9. In some embodiments, the DCI carrying the second signaling includes a wake-up indication, and/or a second type of information. The configuration information of the UE includes location information in the DCI.

In some embodiments, the UE monitors the DCI carrying the second signaling in a specific cell. The specific cell may be Pcell, PScell, or Spcell.

In some embodiments, the UE configuration information includes: location information of wakeup indicated in the DCI, and/or information of the second type of information in the DCI. Take FIG. 4 as an example.

In some embodiments, the wake-up indications of different serving cells or activated serving cells, and/or the second type of information adopt a joint coding manner.

In some embodiments, the second type of information may be a combination of one or more of an offset of time-domain resource allocation information, the bandwidth part indicator information, maximum MIMO layer information, PDCCH monitoring information or reference signal resource set indication.

Example 10. In some embodiments, the DCI carrying the second signaling includes a wake-up indication, and/or a second type of information. The configuration information of the UE includes the cell ID and the location of the corresponding information in the DCI.

In some embodiments, the UE monitors the DCI carrying the second signaling in a specific cell. The specific cell may be Pcell, PScell, or Spcell.

In some embodiments, the UE configuration information includes: location information of wakeup indicated in the DCI, and/or information of the second type of information in the DCI.

In some embodiments, the DCI carrying the second signaling includes a wakeup indication domain, and a second type of information domain.

In some embodiments, the DCI carrying the second signaling includes a plurality of code blocks.

In some embodiments, the second type of information may be a combination of one or more of an offset of time-domain resource allocation information, part of the bandwidth part indicator information, maximum MIMO layer information, PDCCH monitoring information, or reference signal resource set indication.

In some embodiments, the second type of information may be an offset of time domain resource allocation information, bandwidth part indicator information, a maximum MIMO layer indication, PDCCH monitoring information, or reference signal resource set indication information.

In some embodiments, the second type of information may be bandwidth part indicator information and maximum MIMO layer information. Herein, the bandwidth part and the maximum MIMO layer may have independent bit fields in B(i); or, the bandwidth part and the maximum MIMO layer are jointly encoded in B(i); or The wake-up indication, bandwidth part, and maximum MIMO layer are jointly encoded in B(i).

In some embodiments, the second type of information may be bandwidth part indicator information, and PDCCH monitoring information. Herein, part of the bandwidth and PDCCH monitoring information may have independent bit fields in B(i); or part of the bandwidth and PDCCH monitoring information are jointly encoded in B(i); or, wake-up indication, part Bandwidth, PDCCH monitoring information is jointly encoded in B(i).

In some embodiments, the second type of information may be bandwidth part indicator information, and a reference signal resource set indication. Herein, part of the bandwidth and reference signal resource set indication may have an independent bit field in B(i); or part of the bandwidth and reference signal resource set indicates joint coding in B(i); or, wake-up indication, bandwidth part, or joint coding in PDCCH monitoring information.

Example 11. In some embodiments, the DCI carrying the first signaling includes the first type of information. The location of the first type of information is based on predefined conditions that are related to at least one of the following factors: DCI format, location of several information fields in the DCI, or search space.

If the first predefined condition is met, the first type of information domain is before the UL/SUL information field.

If the second predefined condition is met, the first type of information domain is after the carrier indicator information field or the UL/SUL information field or the bandwidth part indicator information field.

If the third predefined condition is met, the first type of information field is after the carrier indicator information field or the bandwidth part indicator information field.

The first predefined condition is that the DCI format of the bearer indication information is 0_0, or the number of bits after the UL/SUL information field in the DCI is a fixed length (including 0), or the information field bit length after the UL/SUL information field in the DCI is related to only UE level or cell level or carrier level parameter/configuration.

The second predefined condition is that the DCI format of the bearer indication information is 0_1, or the number of bits before the carrier indicator information field or the UL/SUL information field or the bandwidth part indicator information field in the DCI is a fixed length (including 0). Or, the information field bit length before the carrier indicator information field or the UL/SUL information field or the bandwidth part indicator information field in the DCI in the DCI is related to only UE level or cell level or carrier level parameter configuration.

The third predefined condition is that the DCI format of the bearer indication information is 1_1, or the number of bits before the carrier indicator information field or the bandwidth part indicator information field in the DCI is a fixed length (including 0), or the DCI The information field bit length before the carrier indicator information field or the bandwidth part indicator information field in the DCI is related to only UE level or cell level or carrier level parameter configuration.

Example 12. In some embodiments, the DCI carrying the first signaling includes the first type of information. The first information field to be carried may be the following information field as a predefined code point or a partial bit:

Frequency domain resource assignment field;
Retransmission process number (HARQ process number) field;
Carrier indicator field;
Bandwidth part indication (BWP indicator) field;
A second transport block (transport block 2) field;
Downlink assignment index field;
Modulation and coding scheme domain;
Precoding information and number of layers;
Antenna port domain;

Example 12-1. In some embodiments, for the first type of information, the bit field of the indication information includes part or all of the code points or partial or all bits in the bandwidth part indication domain.

For an example, the first code point set in the bandwidth part indication domain indicates a bandwidth part, and the second code point set in the bandwidth part indication domain represents the first type of information.

For another example, the first bit set in the bandwidth part indication domain indicates a bandwidth part, and the second bit set in the bandwidth part indication domain represents the first type of information. The first set of bits is most/least significant bits in the bandwidth part indication field.

For yet another example, if the UE does not support switching the BWP through the DCI, the indication manner of the first type of information includes a bandwidth part indication field; otherwise, the bandwidth part indication field indicates a bandwidth part.

Example 12-2. In some embodiments, for the first type of information, the bit field of the indication information includes some or all code points or partial bits or all bits in the downlink allocation index domain.

For an example, the first code point set in the downlink allocation index field indicates a downlink allocation index, and the second code point set in the bandwidth part indication field indicates the first type information.

For another example, the first bit set in the downlink allocation index field indicates a downlink allocation index, and the second bit set in the downlink allocation index field indicates the first type information. The first set of bits is a high-order bit or a status bit in the bandwidth part indication field.

For yet another example, if the first condition is met, the indication manner of the first type of information includes a downlink allocation index field; otherwise, the downlink allocation index field indicates a downlink allocation index.

In some embodiments, the downlink allocation index field includes at least one of the following: a first downlink allocation index domain, a second downlink allocation index domain, or a downlink allocation index domain.

For example, for the first downlink allocation index field, the first condition is to adopt a dynamic HARQ-ACK codebook. If the dynamic HARQ-ACK codebook is used, the first downlink allocation index field indicates a codebook; otherwise, the first downlink allocation index field indicates that the codebook includes at least one bit or one code point indicating the first class. information; For the second downlink allocation index field, the first condition is a dynamic HARQ-ACK codebook based on two sub-HARQ-ACK codebooks (sub-code books). If the dynamic HARQ-ACK codebook is based on two sub-HARQ-ACK codes, the first downlink allocation index field indicates a codebook; otherwise, the first downlink allocation index includes at least one bit or one code point indicating the first type of information (eg, two bits, or four code points);

For the downlink allocation index field, the first condition is that the number of serving cells in the downlink configuration is greater than 1, and is a dynamic HARQ-ACK codebook. If the number of serving cells configured for the downlink is greater than 1, and is a dynamic HARQ-ACK codebook, the downlink allocation index field indicates a codebook; otherwise, the downlink allocation index field includes at least one bit or one code point indication a type of information (e.g., two bits, a high bit of 2 bits, or four code points).

Exemplary Methods for the Disclosed Technology

Figure 8:
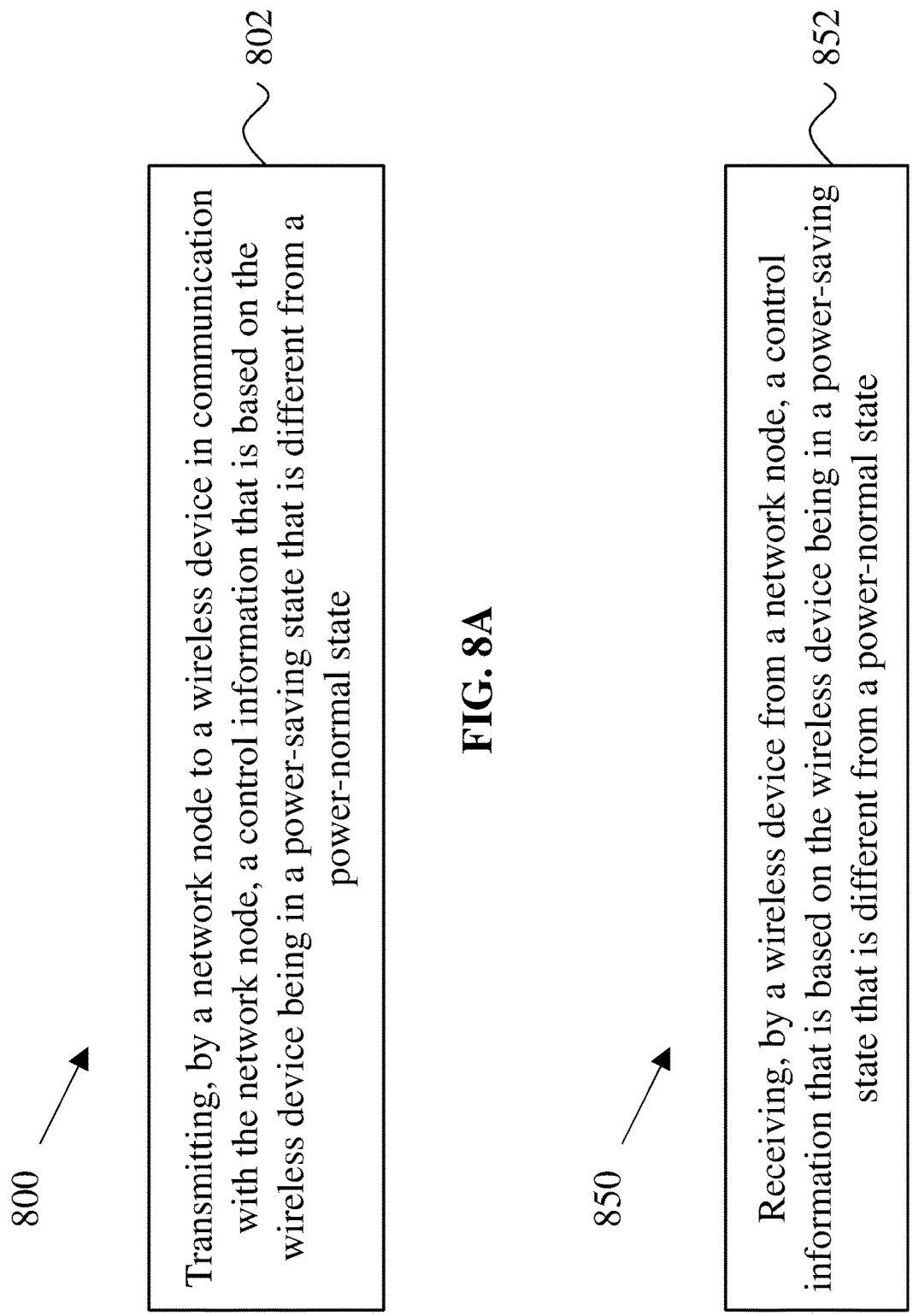
FIGS. 8A and 8B show examples of wireless communication methods, in accordance with some embodiments of the presently disclosed technology.

FIG. 8A shows an example of a wireless communication method 800 for signaling to reduce power consumption of wireless devices in power saving modes. The method 800 includes, at step 802, transmitting, by a network node to a wireless device in communication with the network node, a control information that is based on the wireless device being in a power-saving state that is different from a power-normal state.

FIG. 8B shows another example of a wireless communication method 850 for signaling to reduce power consumption of wireless devices in power saving modes. The method 850 includes, at step 852, receiving, by a wireless device from a network node, a control information that is based on the wireless device being in a power-saving state that is different from a power-normal state.

Implementations for the Disclosed Technology

Figure 9:
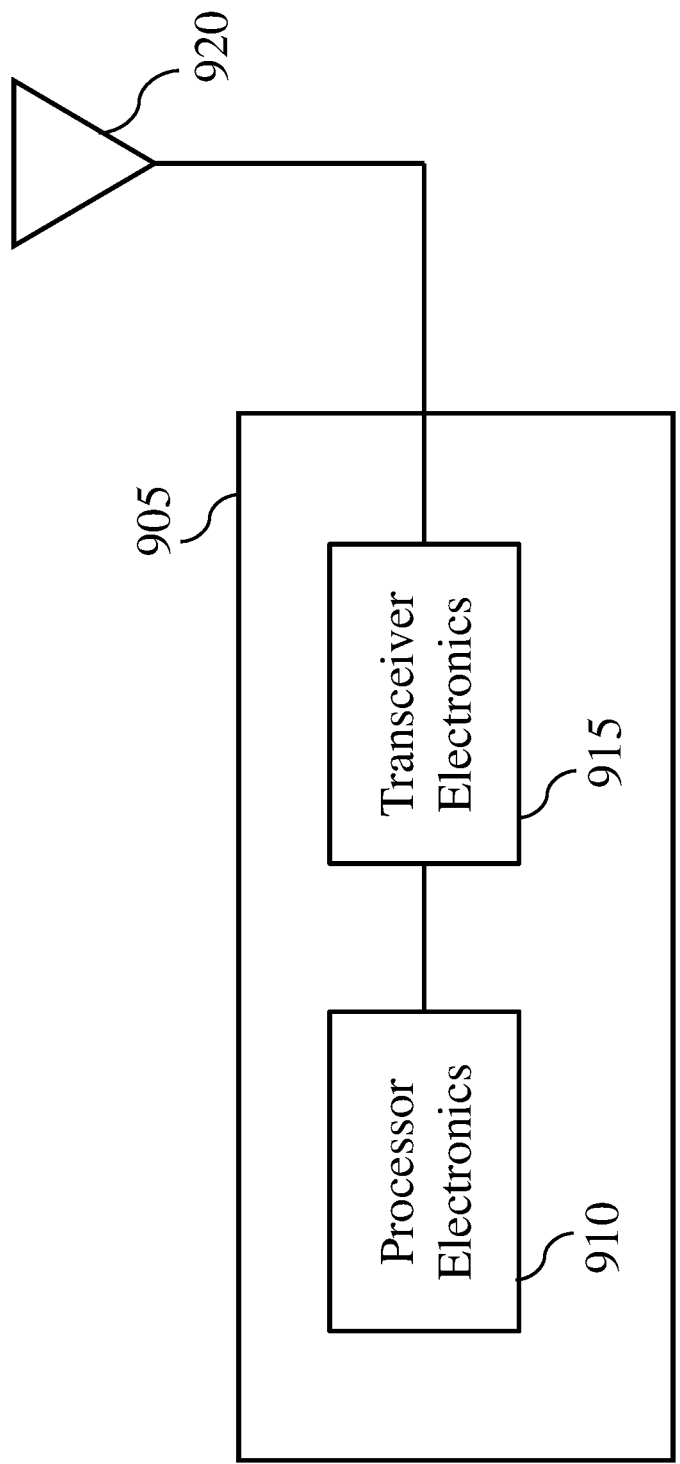
FIG. 9 is a block diagram representation of a portion of an apparatus, in accordance with some embodiments of the presently disclosed technology.

FIG. 9 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   transmitting, by a network node to a wireless device in communication with the network node, a control information,
   wherein the control information is based on the wireless device being in a power-saving state that is different from a power-normal state, wherein the power-normal state is a discontinuous reception (DRX) state that comprises a DRX active time, a running DRX-on duration timer, or a DRX not being configured, and wherein the control information includes a reference signal (RS) resource set indication and a carrier indicator, wherein a reference signal resource set indicated by the RS resource set indication comprises at least one of sounding reference signal (SRS) or a channel state information reference signal (CSI-RS) for tracking (TRS), and a carrier indicated by the carrier indicator is unactivated, and
   wherein time-domain behavior of the reference signal resource set is aperiodic and an offset from a first symbol of the reference signal resource set to the control information is no less than 3 ms.

2. The method of claim 1, wherein the control information further includes a bandwidth part (BWP) indicator, wherein the BWP indicator includes an indication to switch to a dormant BWP or an indication to switch out of the dormant BWP.

3. The method of claim 1, wherein the control information further comprises a first bit field and a second bit field, and wherein:
   (1) the first bit field comprises a first code point or wake-up information, and wherein the second bit field comprises an indication of a duration for the wake-up information; or
   (2) the first bit field comprises a second code point or non-awake information, and wherein the second bit field comprises an indication of a duration for the non-awake information.

4. The method of claim 1, wherein the control information is communicated in a first cell or a first cell group, and wherein an information communicated for a second cell or a second cell group is determined by at least one of: a cell identification (ID), a location in the control information, a mapping rule, a configured parameter of the first cell or the first cell group, a configured parameter of the second cell or the second cell group, or a modification method.

5. The method of claim 1, wherein a signal comprising the control information in multiple beams uses a same aggregation level among the multiple beams.

6. A method for wireless communication, comprising:
   receiving, by a wireless device from a network node, a control information,
   wherein the control information is based on the wireless device being in a power-saving state that is different from a power-normal state, wherein the power-normal state is a discontinuous reception (DRX) state that comprises a DRX active time, a running DRX-on duration timer, or a DRX not being configured, and wherein the control information includes a reference signal (RS) resource set indication and a carrier indicator, wherein a reference signal resource set indicated by the RS resource set indication comprises at least one of sounding reference signal (SRS) or a channel state information reference signal (CSI-RS) for tracking (TRS), and wherein a carrier indicated by the carrier indicator is unactivated, and
   wherein time-domain behavior of the reference signal resource set is aperiodic and an offset from a first symbol of the reference signal resource set to the control information is no less than 3 ms.

7. The method of claim 6, wherein the control information includes a bandwidth part (BWP) indicator, wherein the BWP indicator includes an indication to switch to a dormant BWP or an indication to switch out of the dormant BWP.

8. The method of claim 6, wherein the control information further comprises a first bit field and a second bit field, and wherein:
   (1) the first bit field comprises a first code point or wake-up information, and wherein the second bit field comprises an indication of a duration for the wake-up information; or
   (2) the first bit field comprises a second code point or non-awake information, and wherein the second bit field comprises an indication of a duration for the non-awake information.

9. The method of claim 6, wherein the control information is communicated in a first cell or a first cell group, and wherein an information communicated for a second cell or a second cell group is determined by at least one of: a cell identification (ID), a location in the control information, a mapping rule, a configured parameter of the first cell or the first cell group, a configured parameter of the second cell or the second cell group, or a modification method.

10. The method of claim 6, wherein a signal comprising the control information in multiple beams uses a same aggregation level among the multiple beams.

11. An apparatus for wireless communication comprising a processor and a memory storing instructions, execution of which by the processor causes the apparatus to:
   transmit, to a wireless device, a control information,
   wherein the control information is based on the wireless device being in a power-saving state that is different from a power-normal state, wherein the power-normal state is a discontinuous reception (DRX) state that comprises a DRX active time, a running DRX-on duration timer, or a DRX not being configured, and wherein the control information includes a reference signal (RS) resource set indication and a carrier indicator, wherein the reference signal resource set indicated by the RS resource set indication comprises at least one of sounding reference signal (SRS) or a channel state information reference signal (CSI-RS) for tracking (TRS), and wherein a carrier indicated by the carrier indicator is unactivated, and wherein time-domain behavior of the reference signal resource set is aperiodic and an offset from a first symbol of the reference signal resource set to the control information is no less than 3 ms.

12. The apparatus of claim 11, wherein the control information further includes a bandwidth part (BWP) indicator, wherein the BWP indicator includes an indication to switch to a dormant BWP or an indication to switch out of the dormant BWP.

13. The apparatus of claim 11, wherein the control information further comprises a first bit field and a second bit field, and wherein:
   (1) the first bit field comprises a first code point or wake-up information, and wherein the second bit field comprises an indication of a duration for the wake-up information; or
   (2) the first bit field comprises a second code point or non-awake information, and wherein the second bit field comprises an indication of a duration for the non-awake information.

14. The apparatus of claim 11, wherein the control information is communicated in a first cell or a first cell group, and wherein an information communicated for a second cell or a second cell group is determined by at least one of: a cell identification (ID), a location in the control information, a mapping rule, a configured parameter of the first cell or the first cell group, a configured parameter of the second cell or the second cell group, or a modification method.

15. The apparatus of claim 11, wherein a signal comprising the control information in multiple beams uses a same aggregation level among the multiple beams.

16. An apparatus for wireless communication comprising a processor and a memory storing instructions, execution of which by the processor causes the apparatus to:
   receive, from a network node, a control information,
   wherein the control information is based on the apparatus being in a power-saving state that is different from a power-normal state, wherein the power-normal state is a discontinuous reception (DRX) state that comprises a DRX active time, a running DRX-on duration timer, or a DRX not being configured, and wherein the control information includes a reference signal (RS) resource set indication and a carrier indicator, wherein the reference signal resource set indicated by the RS resource set indication comprises at least one of sounding reference signal (SRS) or a channel state information reference signal (CSI-RS) for tracking (TRS), and wherein a carrier indicated by the carrier indicator is unactivated, and wherein time-domain behavior of the reference signal resource set is aperiodic and an offset from a first symbol of the reference signal resource set to the control information is no less than 3 ms.

17. The apparatus of claim 16, wherein the control information further includes a bandwidth part (BWP) indicator, wherein the BWP indicator includes an indication to switch to a dormant BWP or an indication to switch out of a dormant BWP.

18. The apparatus of claim 16, wherein the control information further comprises a first bit field and a second bit field, and wherein:
   (1) the first bit field comprises a first code point or wake-up information, and wherein the second bit field comprises an indication of a duration for the wake-up information; or
   (2) the first bit field comprises a second code point or non-awake information, and wherein the second bit field comprises an indication of a duration for the non-awake information.

19. The apparatus of claim 16, wherein the control information is communicated in a first cell or a first cell group, and wherein an information communicated for a second cell or a second cell group is determined by at least one of: a cell identification (ID), a location in the control information, a mapping rule, a configured parameter of the first cell or the first cell group, a configured parameter of the second cell or the second cell group, or a modification method.

20. The apparatus of claim 16, wherein a signal comprising the control information in multiple beams uses a same aggregation level among the multiple beams.

* * * * *